(12) United States Patent
Purkayastha et al.

(10) Patent No.: US 8,149,790 B2
(45) Date of Patent: Apr. 3, 2012

(54) BI-DIRECTIONAL HANDOVER METHOD AND APPARATUS

(75) Inventors: Debashish Purkayastha, Pottstown, PA (US); Shamim Akbar Rahman, Montreal (CA)

(73) Assignees: InterDigital Technology Corporation, Wilmington, DE (US); SK Telecom, Co. Ltd., Seoul (KR)

( * ) Notice: Subject to any disclaimer, the term of this patent is extended or adjusted under 35 U.S.C. 154(b) by 692 days.

(21) Appl. No.: 12/209,329

(22) Filed: Sep. 12, 2008

(65) Prior Publication Data

US 2009/0103496 A1 Apr. 23, 2009

Related U.S. Application Data

(60) Provisional application No. 60/971,950, filed on Sep. 13, 2007, provisional application No. 60/972,095, filed on Sep. 13, 2007.

(51) Int. Cl.
*H04W 36/00* (2009.01)
(52) U.S. Cl. .................................. 370/332; 455/436
(58) Field of Classification Search .......... 370/331, 370/332, 335, 338, 342; 455/432.1, 433, 455/435.1, 436
See application file for complete search history.

(56) References Cited

U.S. PATENT DOCUMENTS

| | | | |
|---|---|---|---|
| 7,483,984 B1 | 1/2009 | Jonker et al. | |
| 2006/0230151 A1* | 10/2006 | Kim et al. | 709/226 |
| 2006/0259598 A1* | 11/2006 | Kim et al. | 709/222 |
| 2007/0025297 A1 | 2/2007 | Lee et al. | |
| 2007/0091846 A1* | 4/2007 | Kim et al. | 370/331 |
| 2008/0064402 A1* | 3/2008 | Oh | 455/436 |
| 2008/0096558 A1* | 4/2008 | Liu et al. | 455/435.2 |
| 2008/0101300 A1* | 5/2008 | Oh | 370/332 |
| 2008/0198804 A1 | 8/2008 | Rahman et al. | |
| 2008/0304454 A1 | 12/2008 | Zhong et al. | |
| 2009/0005047 A1* | 1/2009 | Gupta et al. | 455/437 |

FOREIGN PATENT DOCUMENTS

| | | |
|---|---|---|
| JP | 2004-349976 | 12/2004 |
| JP | 1 670 273 | 6/2006 |
| WO | 2006/124514 | 11/2006 |
| WO | 2007/038272 | 4/2007 |

OTHER PUBLICATIONS

Third Generation Partnership Project, "Technical Specification Group Services and Systems Aspects; 3GPP System Architecture Evolution: Report on Technical Options and Conclusions (Release 7)," fD.3.5, 3GPP TR 23.882 V1.9.0 (Mar. 2007).

Gupta, "IEEE P802.21 Media Independent Handover Service Draft Technical Requirements," 21-04-0087-12/0000 (Sep. 2004).

Gupta, "IEEE P802.21 Media Independent Handover Service Draft Technical Requirements," 21-04-0087-12-0000 (Sep. 2004).

(Continued)

*Primary Examiner* — Brian Nguyen
(74) *Attorney, Agent, or Firm* — Volpe and Koenig, P.C.

(57) ABSTRACT

Apparatus for bi-directional handover are disclosed. An apparatus configured to perform handover from a wireless code division multiple access (WCDMA) to a wireless broadband (WiBro) network is disclosed. An apparatus configured to perform handover from a WCDMA network to a WiFi (IEEE 802.11x) network is disclosed. An apparatus configured to perform handover from a WiFi network to a WCDMA network is disclosed.

21 Claims, 20 Drawing Sheets

OTHER PUBLICATIONS

LAN MAN Standards Committee of the IEEE Computer Society, "Draft Standard for Local and Metropolitan Area Networks; Media Independent Handover Services", IEEE P802.21, D07-00, (Jul. 2007).

LAN MAN Standards Committee of the IEEE Computer Society, "Draft Standard for Local and Metropolitan Area Networks; Media Independent Handover Services", IEEE P802.21, D14, (Sep. 2008).

LAN MAN Standards Committee of the IEEE Computer Society, "Draft Standard for Local and Metropolitan Area Networks: Media Independent Handover Services," IEEE P802.21/D7.1 (Aug. 2007).

Third Generation Partnership Project, "Technical Specification Group Services and Systems Aspects; 3GPP System Architecture Evolution: Report on Technical Options and Conclusions (Release 7)," fD.3.5, 3GPP TR 23.882 V1.9.0 (Mar. 2007).

\* cited by examiner

BI-DIRECTIONAL HANDOVER METHOD AND APPARATUS

CROSS REFERENCE TO RELATED APPLICATIONS

This application claims the benefit of U.S. provisional application No. 60/971,950 filed on Sep. 13, 2007 and 60/972,095 filed on Sep. 13, 2007, which are incorporated by reference as if fully set forth.

TECHNICAL FIELD

The subject matter disclosed herein relates to wireless communications.

BACKGROUND

The IEEE 802.21 Media Independent Handover (MIH) standard defines mechanisms and procedures that aid in the execution and management of inter-access technology mobility management. IEEE 802.21 defines three main services available to Mobility Management applications. Referring to FIG. 1, these services are the Event Service 100, the Information Service 105 and the Command Service 110. These services aid in the management of handover operations, system discovery and system selection by providing information and triggers from lower layers 115 to upper layers 120, and lower layer commands from upper layers 120 to lower layers 115 via a media independent handover function (MIHF) 125. While FIG. 1 shows MIHF 125 as a middle layer in a protocol stack, MIHF 125 may also be implemented as an MIH plane that is capable of exchanging information and triggers directly with each and every layer of a technology-specific protocol stack.

Events may indicate changes in state and transmission behavior of the physical, data link and logical link layers, or predict state changes of these layers. The Event Service 100 may also be used to indicate management actions or command status on the part of the network or a management entity. The command service 110 enables higher layers to control the physical, data link, and logical link layers (referred to collectively as lower layers). The higher layers may control the reconfiguration or selection of an appropriate link through a set of handover commands. If an MIHF supports the command service, all MIH commands are mandatory in nature. When an MIHF receives a command, it is always expected to execute the command. The Information Service 105 provides a framework and corresponding mechanisms by which an MIHF entity may discover and obtain network information existing within a geographical area to facilitate handover.

The MIH standard may be applied to support handover between various radio access technologies (RATs), including wireless code division multiple access (WCDMA), IEEE 802.11x (WiFi), IEEE 802.3, IEEE 802.14, IEEE 802.16 (WiMAX), IEEE 802.16e (WiBro), Third Generation Partnership Project (3GPP) and Third Generation Partnership Project Two (3GPP2) technologies. A wireless transmit/receive unit (WTRU) may be handed over from a network of one type to another. Where a WTRU can communicate via WCDMA and WiBro technologies, it would be beneficial for the WTRU to support MIH handover from WCDMA to WiBro and from WiBro to WCDMA. Where a WTRU can communicate via WCDMA and WiFi technologies, it would be beneficial for the WTRU to support MIH handover from WCDMA to WiFi and from WiFi to WCDMA. An approach is required for a WTRU to support MIH bi-directional handover in these and other contexts. Therefore, it would be beneficial for MIH handover to be supported in a WTRU via an MIH middleware.

SUMMARY

Apparatus for bi-directional handover are disclosed. An apparatus configured to perform handover from a wireless code division multiple access (WCDMA) to a wireless broadband (WiBro) network is disclosed. An apparatus configured to perform handover from a WCDMA network to a WiFi (IEEE 802.11x) network is disclosed. An apparatus configured to perform handover from a WiFi network to a WCDMA network is disclosed.

BRIEF DESCRIPTION OF THE DRAWINGS

A more detailed understanding may be had from the following description of a preferred embodiment, given by way of example and to be understood in conjunction with the accompanying drawings wherein.

DETAILED DESCRIPTION

When referred to herein, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to herein, the terminology "base station" includes but is not limited to a Node-B, a site controller, an access point (AP), or any other type of interfacing device capable of operating in a wireless environment.

Figure 1:
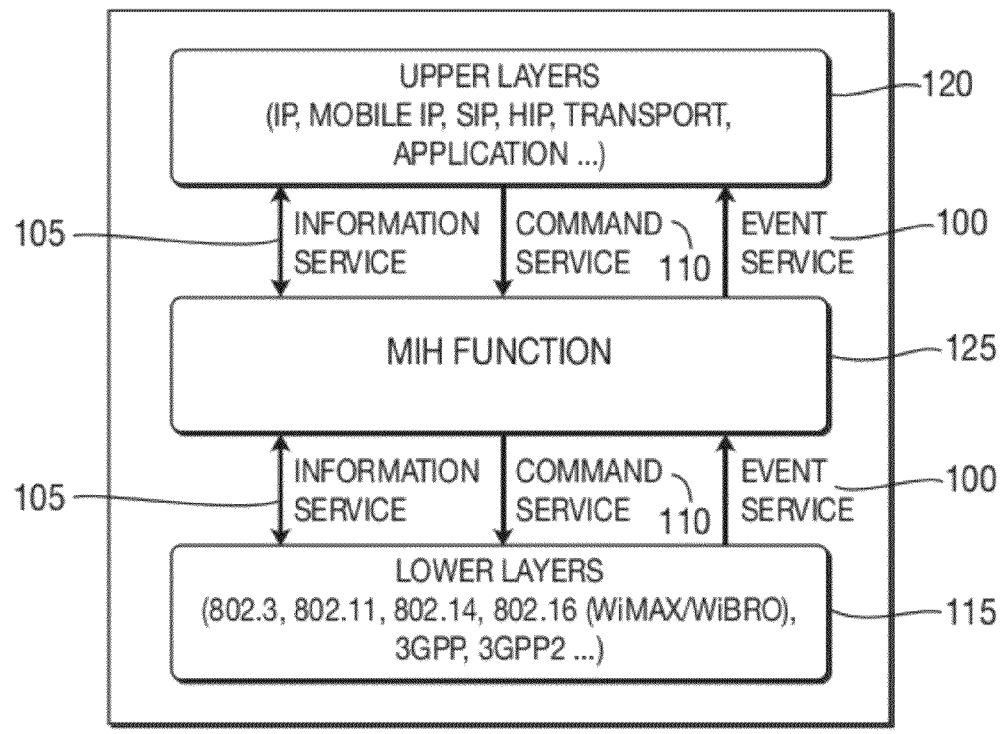
FIG. 1 is an IEEE 802.21 protocol architecture.
Figure 2:
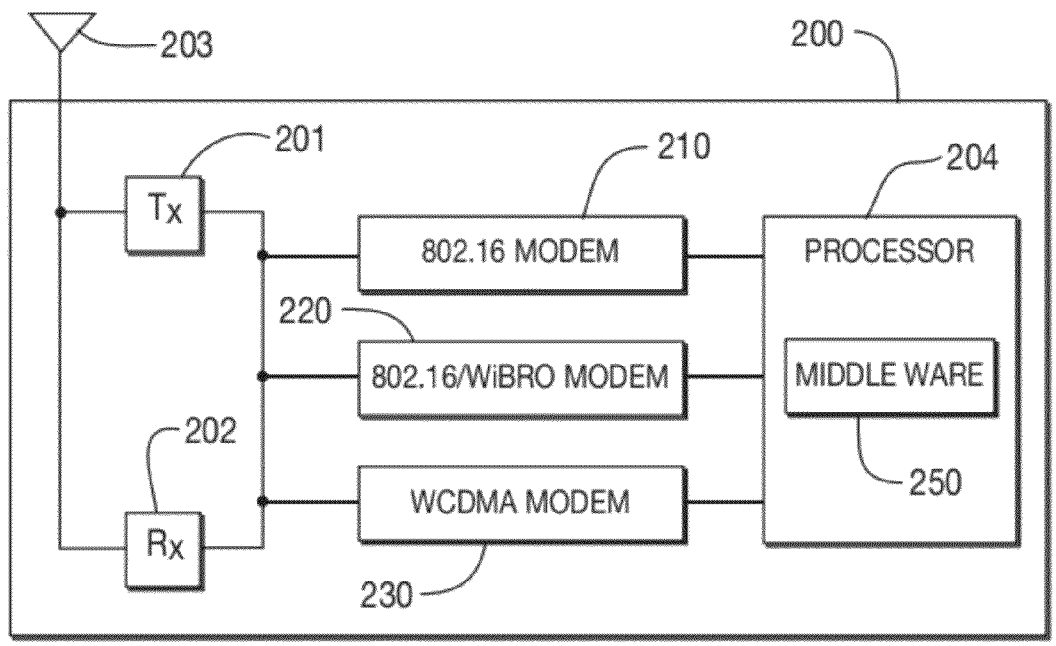
FIG. 2 is a block diagram of an exemplary WTRU.

FIG. 2 is a WTRU 200 in accordance with an embodiment. The WTRU includes a transceiver 201, receiver 202, and antenna 203. In communication with the transceiver 201 and receiver 202 are an 802.11x modem 210, 802.16/WiBro modem 220, and a WCDMA modem 230. In communication with the modems 210, 220, 230 is a processor 204 that includes an MIH middleware 250. In accordance with different embodiments, a WTRU need not include modems of all three types depicted in FIG. 2. A WTRU in accordance with an embodiment may include a pair of modems such as an 802.11x modem and a WCDMA modem. A WTRU in accordance with another embodiment may include a pair of modems such as an 802.16/WiBro modem and a WCDMA modem.

Figure 3:
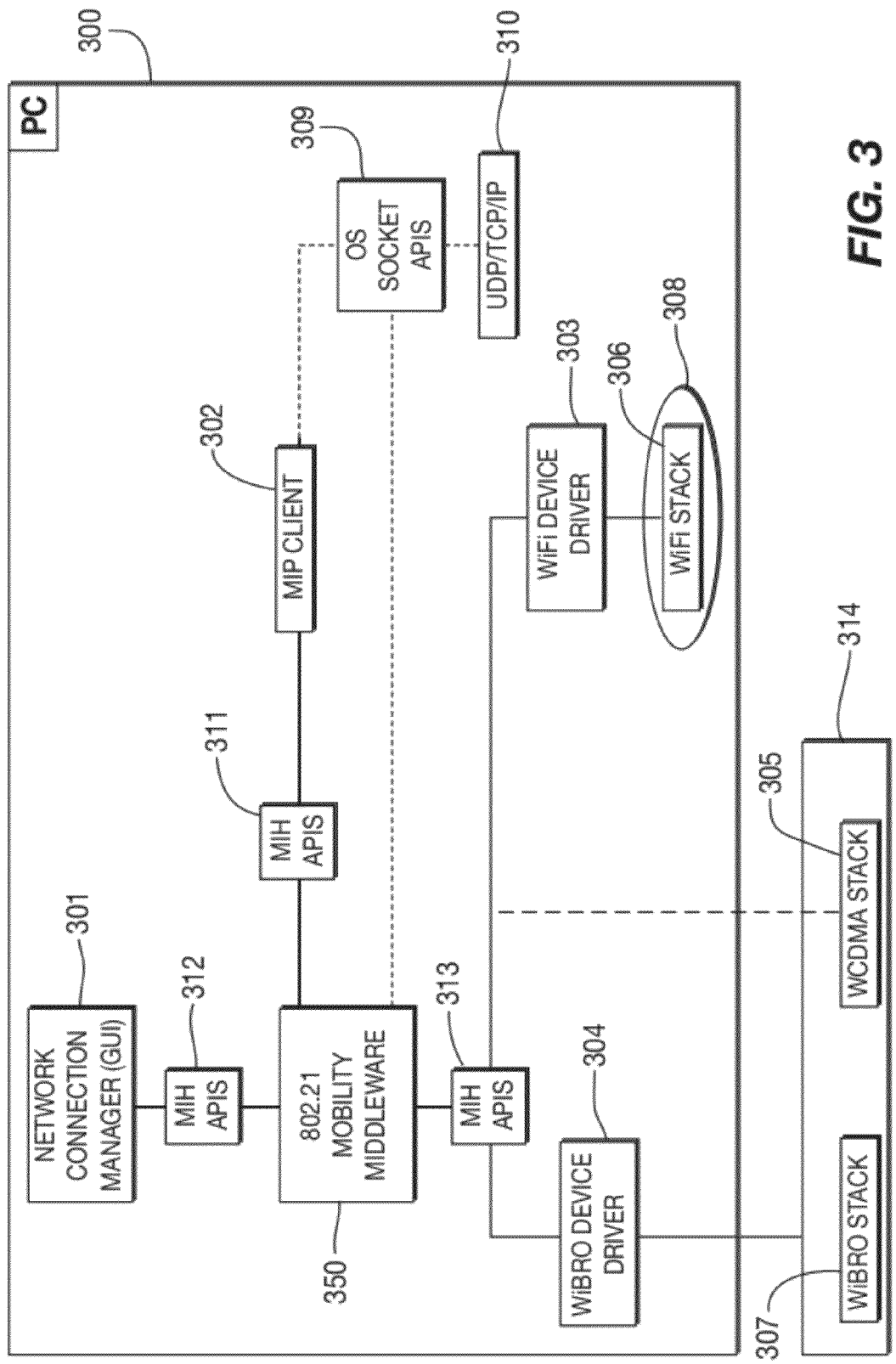
FIG. 3 is a block diagram of an exemplary PC.

FIG. 3 depicts a PC 300 for wireless communication in accordance with an embodiment. The PC 300 includes a network connection manager 301 that provides a graphical user interface (GUI) to a user. The network connection manager 301 communicates with an MIH middleware 350 via MIH APIs 312. The middleware 350 is in communication with a Mobile Internet Protocol (MIP) client 302 via MIH APIs 311. The MIH middleware 350 communicates with the network protocol modules 310 of the PC operating system via operating system socket APIs 309. Protocols that may be implemented by the network protocol modules 310 include User Datagram Protocol (UDP), Transmission Control Protocol (TCP), and Internet Protocol (IP). The MIP client 302 also communicates with the network protocol modules 309 via operating system socket APIs 309. The MIH middleware communicates via MIH APIs 313 with multiple RAT device drivers, including a WiFi driver 303 and a WiBro driver 304. The WiFi driver 303 is in communication with a WiFi stack 306, and the WiBro driver 304 is in communication with a WiBro stack 307. The WiFi stack 306 may be integrated into a technology such as a Mini Peripheral Component Interconnect (PCI) WiFi card 308. The middleware 350 may also communicate with a WCDMA stack 305 via communication technologies such as Universal Serial Bus (USB), serial ports, or virtual serial ports implemented over USB. When the middleware 350 communicates with the WCDMA stack 305 via a serial port or virtual serial port technology, it may do so over a dedicated communications port using AT commands compliant with the Third Generation Partnership Project (3GPP). In an embodiment, the WCDMA stack 305 may be integrated into a USB device 314 such as a USB dongle. Communication between the WiBro device driver 304 and the WiBro stack 307 may be accomplished via a communication technology such as USB. The MIH middleware 350 may communicate with other functions, drivers and RATs using MIH applications, and other operating system application such as Microsoft Windows applications. When the PC operating system is Microsoft Windows, WiFi is supported in the operating system through the use of ObjectID (OID). In an embodiment, OIDs can be mapped to MIH primitives; in such a case, the MIH middleware 350 may process the OIDs for link detection, handover detection, and the like.

Approaches for supporting handover in MIH across WiBro to WCDMA and vice versa may include handovers triggered by a media independent handover (MIH) server and not by WCDMA radio access, detecting WiBro when a WTRU is in a WCDMA network, and policies to perform a bi-directional handover. Technologies and approaches such as Mobile internet protocol (IP), break before make, and the like, may also be utilized.

In order to facilitate bi-directional handover between WiBro and WCDMA technologies, the MIH server side may include a method to detect WiBro when in WCDMA. This may be accomplished by providing a WTRU with a WiBro neighbor list when the WTRU is in WCDMA coverage. A database may be utilized in the MIH server that correlates the topologies of WCDMA and WiBro cells. Alternatively, a periodic scan command may be communicated to the WTRU to search for WiBro neighbors. The MIH server may include policies to trigger handovers. Additionally, aspects of middleware to support MIH messaging and relating processing may include getting a WiBro neighbor list, periodic scan commands for WiBro, an MIH controlled handover back to WiBro, and the like.

Figure 4:
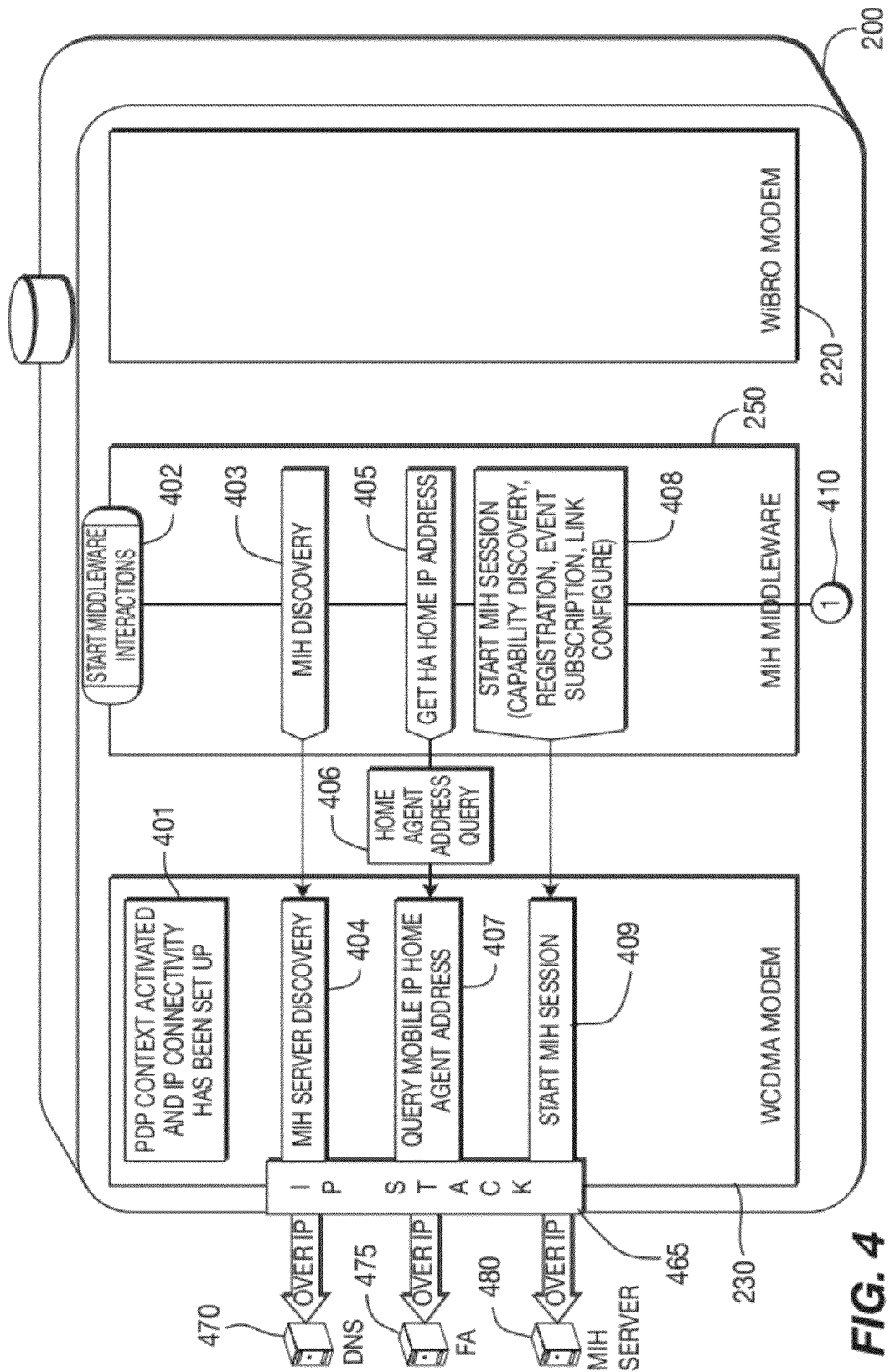
FIG. 4 is a functional block diagram of an exemplary registration procedure for WCDMA to WiBro handover.

FIG. 4 is a functional block diagram of an exemplary registration procedure for WCDMA to WiBro handover in accordance with an embodiment. The WTRU 200 includes an MIH middleware 250, WCMDA modem 230, and a WIBRO modem 220. The WCDMA modem 230 communicates with an IP stack 465. The IP stack 465 communicates via IP with a Domain Name Server (DNS) 470, a Foreign Agent server (FA) 475, and an MIH server 480. The IP stack 465 can be configured to use User Datagram Protocol (UDP) or Transmission Control Protocol (TCP) in the transport layer.

The registration procedure is started in the WCDMA network. At 401, a Packet Data Protocol (PDP) context is activated and IP connectivity is setup. At 402, middleware interactions are started. At 403, the MIH middleware 250 acts to start MIH discovery. At 404, the WCDMA modem 230 performs MIH server discovery in conjunction with the DNS 470. At 405, the MIH middleware 250 acts to obtain an Home Agent (HA) IP address. A Home Agent Address Query message 406 is communicated to the WCDMA modem 230. At 407, the WCDMA modem 230 communicates a query for a Mobile IP HA address to the FA server 475 via the IP stack 465. At 408, the MIH middleware 250 acts to start an MIH session. The MIH session may include capability, discovery, registration, event subscription, and link configure functions. At 409, the WCDMA modem 230 communicates a start MIH session message to the MIH server 480 via the IP stack 465.

At the conclusion of the procedure depicted in FIG. 4, State One 410 is achieved.

Figure 5:
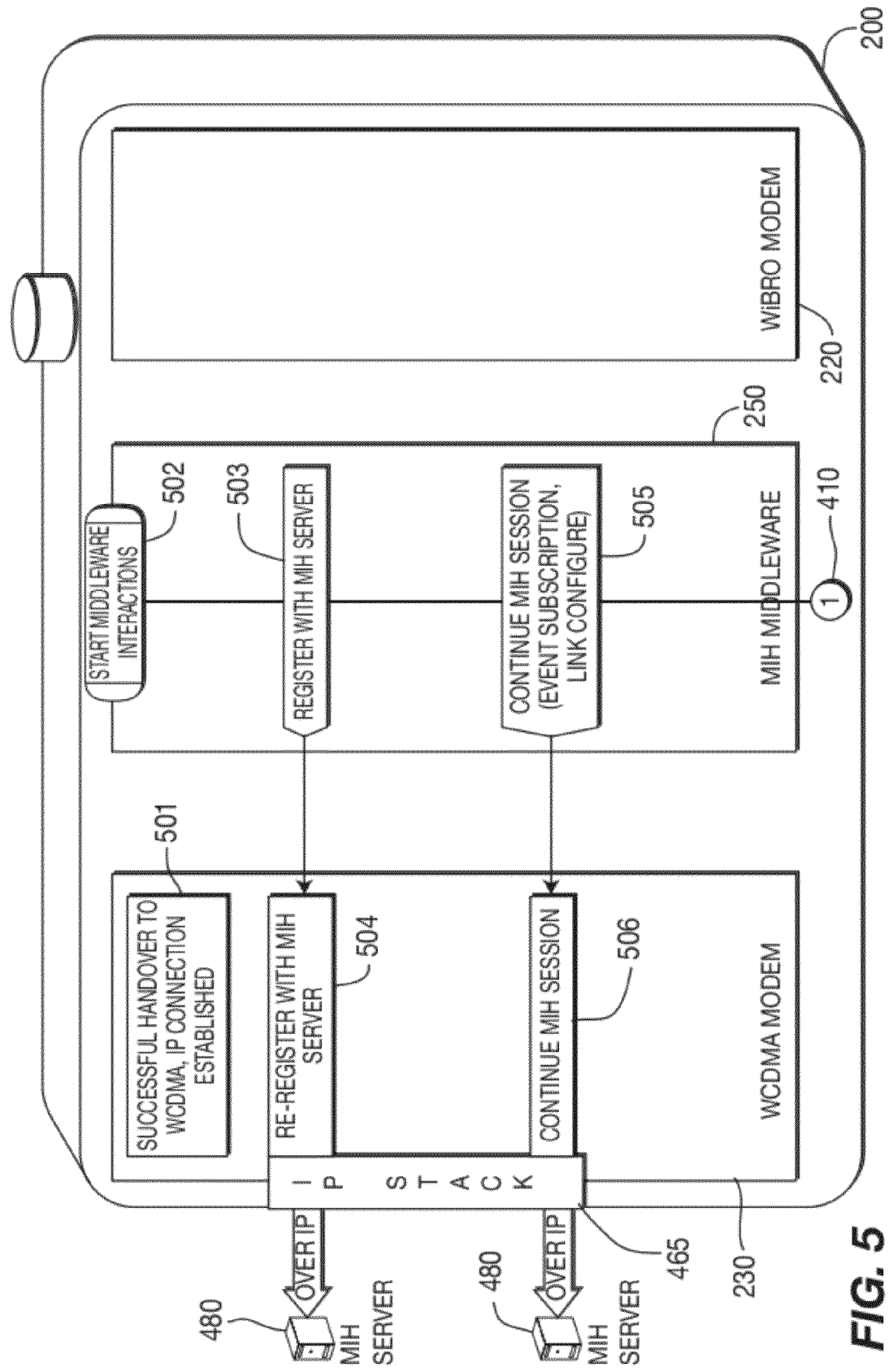
FIG. 5 is a functional block diagram of an exemplary registration procedure for WCDMA to WiBro handover.

FIG. 5 is a functional block diagram of an exemplary registration procedure for WCDMA to WiBro handover in accordance with another embodiment. The WTRU 200 includes the MIH middleware 250, WCMDA modem 230, and WIBRO modem 220. The WCDMA modem 230 communicates with the IP stack 465. The IP stack 465 communicates via IP with the MIH server 480. The IP stack 465 can be configured to use UDP or TCP in the transport layer. As shown in FIG. 5, the registration procedure is performed after handover to WCDMA.

At 501, successful handover to WCDMA is completed and an IP connection is established. At 502, middleware interactions are started. At 503, the MIH middleware 250 acts to register with the MIH server 480. At 504, the WCDMA modem 230 re-registers with the MIH server 408 via the IP stack 465. At 505, the MIH middleware 250 continues the MIH session. The MIH session includes event subscription and link configuration functions. At 506, the WCDMA modem 230 communicates the continuation of the MIH session to the MIH server 480 via the IP stack 465.

At the conclusion of the procedure depicted in FIG. 5, State One 410 is achieved.

Figure 6:
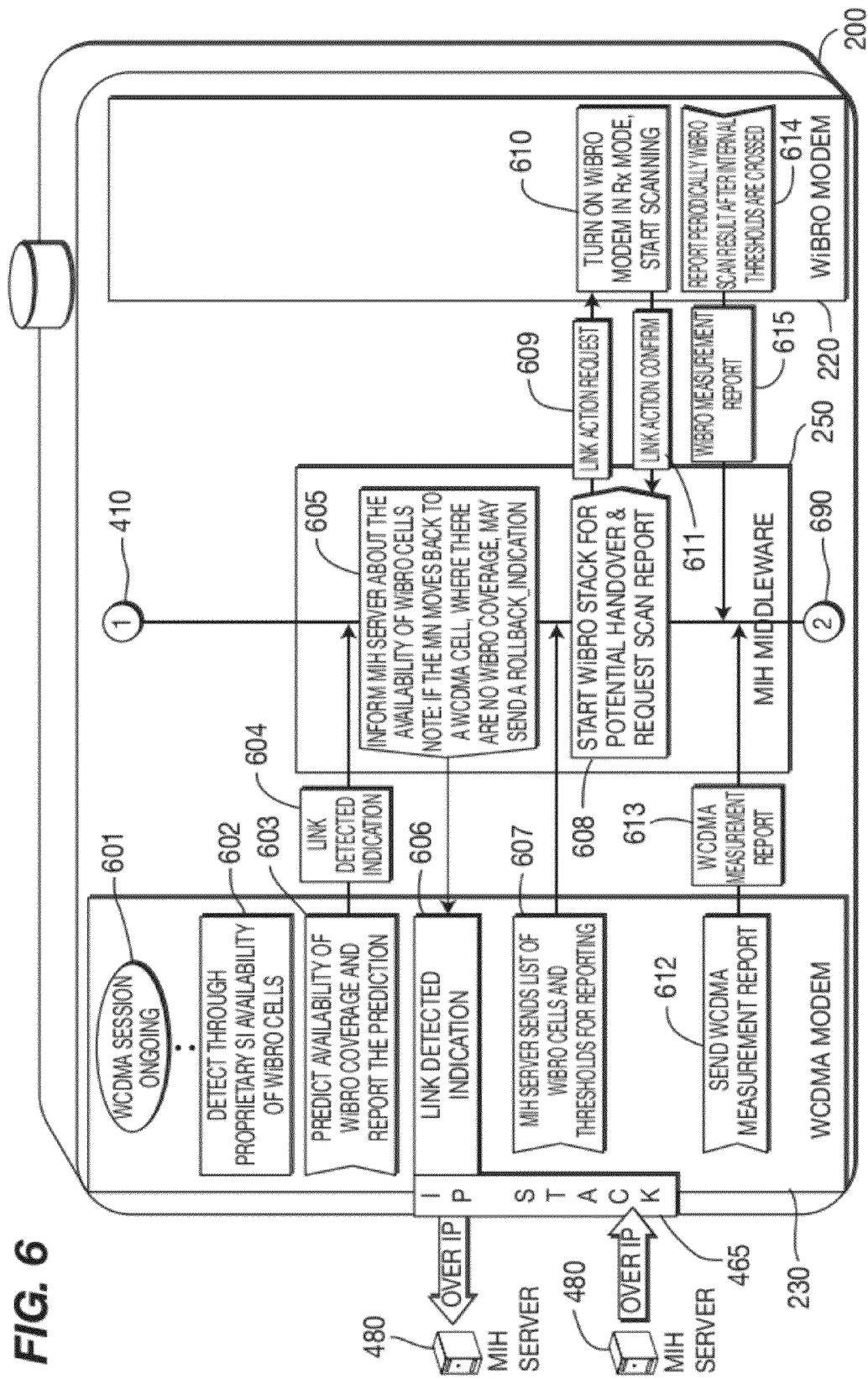
FIG. 6 is a functional block diagram of an exemplary detection procedure for WCDMA to WiBro handover.

FIG. 6 is a functional block diagram of an exemplary detection procedure for WCDMA to WiBro handover in accordance with an embodiment. The WTRU 200 includes the MIH middleware 250, WCMDA modem 230, and WIBRO modem 220. The WCDMA modem 230 communicates with the IP stack 465. The IP stack 465 communicates via IP with the MIH server 480. The IP stack 465 can be configured to use UDP or TCP in the transport layer. The procedure of FIG. 6 may be begun when State One 410 has been achieved.

As seen in 601, a WCDMA session is ongoing. As seen in 602, in the procedure of FIG. 6, WiBro cell availability may be detected through proprietary system information (SI). At 603, the WCDMA modem 230 predicts availability of WiBro coverage and reports the prediction in a WiBro Available (Link Detected Indication) message 604. At 605, the MIH middleware 250 acts to inform the MIH server 480 about the availability of WiBro cells. The availability of WiBro cells is communicated at 606 by the WCDMA modem 230 via IP stack 465. At 605, if the WTRU moves back to a WCDMA cell where there is no WiBro coverage, a ROLLBACK_INDICATION message may be sent to the MIH server 480.

At 607, the MIH server 480 has sent a list of WiBro cells and reporting thresholds via the IP stack 465 of the WCDMA modem 230. At 608, the MIH middleware 250 acts to start the WiBro stack for potential handover and to request a scan report. Performance of 608 includes sending a LINK_ACTION_REQUEST message 609 to the WiBro modem 220. At 610, the WiBro modem 220 turns on in receiver (Rx) mode and starts scanning. The WiBro modem 220 then sends a LINK_ACTION_CONFIRM message 611 to the MIH middleware 250.

At 612, the WCDMA modem 230 sends a WCDMA measurement report 613 to the MIH middleware 250. At 614, the WiBro modem 220 periodically provides a WiBro measurement report 615 to the MIH middleware 250 after WiBro scan results indicate that internal thresholds are crossed.

At the conclusion of the procedure depicted in FIG. 6, State Two 690 is achieved.

Figure 7:
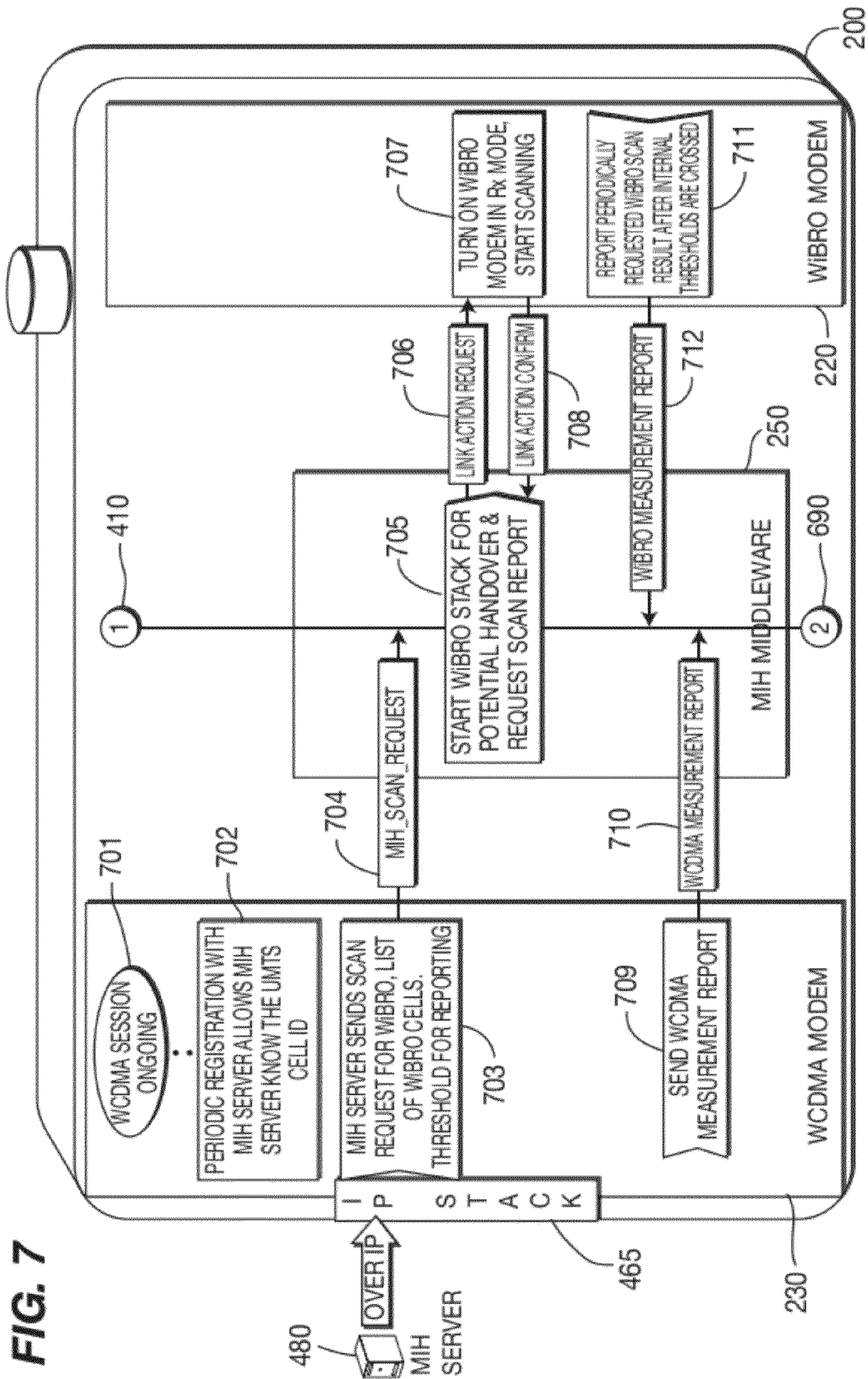
FIG. 7 is a functional block diagram of an exemplary detection procedure for WCDMA to WiBro handover.

FIG. 7 is a functional block diagram of an exemplary detection procedure for WCDMA to WiBro handover in accordance with another embodiment. The WTRU 200 includes the MIH middleware 250, WCMDA modem 230, and WIBRO modem 220. The WCDMA modem 230 communicates with the IP stack 465. The IP stack 465 can be configured to use UDP or TCP in the transport layer. As seen in 701, a WCDMA session is ongoing. As seen in 702, in the procedure of FIG. 7, periodic registration with the MIH server allows the MIH server to know the universal mobile telecommunications system (UMTS) cell ID. The procedure of FIG. 7 may be begun when State One 410 has been achieved.

At 703, the MIH server 480 sends a scan request that includes a request for the list of WiBro cells and a threshold for reporting. This may be in the form of an MIH_SCAN_REQUEST message 704. At 705, the MIH middleware 250 acts to start the Wibro stack of potential handover and to request a scan report. The MIH middleware 250 may perform 705 by sending a LINK_ACTION_REQUEST message 706 to the WiBro modem 220. At 707, the WiBro modem 220 turns on in receiver (Rx) mode and starts scanning. The WiBro modem then sends a LINK_ACTION_CONFIRM message 708 to the MIH middleware 250.

At 711, the WiBro modem 220 reports periodically the requested WiBro scan result after internal thresholds are crossed. This WiBro modem reporting may be in the form of a WiBro measurement report 712 to the MIH middleware 250. At 709, the WCDMA modem 230 sends WCDMA measurement reports in a WCDMA measurement report message 710 to the MIH middleware 250.

At the conclusion of the procedure depicted in FIG. 7, State Two 690 is achieved.

Figure 8:
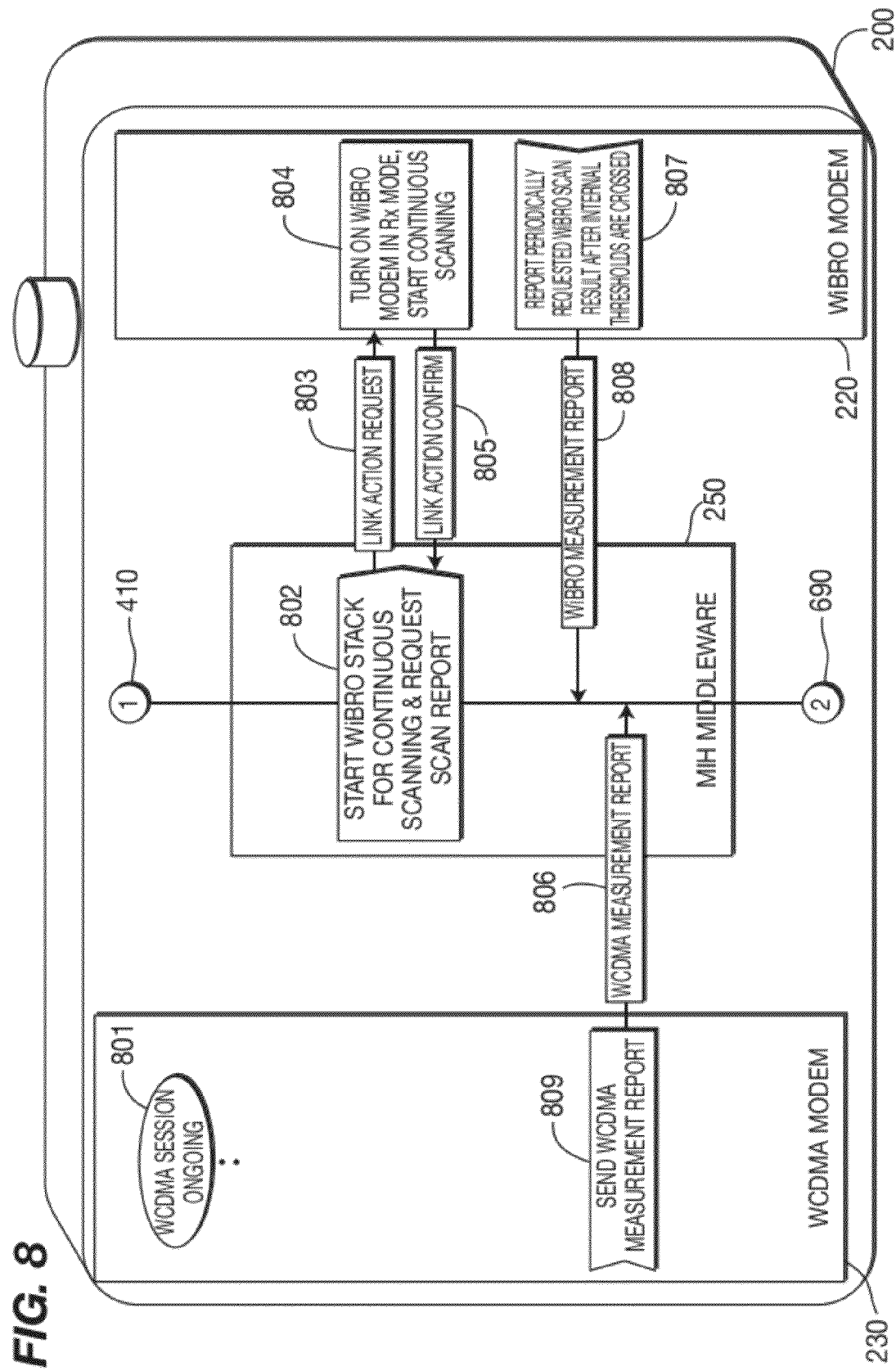
FIG. 8 is a functional block diagram of an exemplary detection procedure for WCDMA to WiBro handover.

FIG. 8 is a functional block diagram of an exemplary detection procedure for WCDMA to WiBro handover in accordance with another embodiment. The WTRU 200 includes the MIH middleware 250, WCMDA modem 230, and WIBRO modem 220. The procedure of FIG. 8 may be begun when State One 410 has been achieved.

As depicted in 801, a WCDMA session is ongoing. At 802, the MIH middleware 250 acts to start the WiBro modem 220 for continuous scanning and to request a scan report. This may be in the form of a LINK_ACTION_REQUEST message 803 communicated to the WiBro modem 220. At 804, the WiBro modem 220 turns on in receiver (Rx) mode and starts continuous scanning. The WiBro modem 220 may send a LINK_ACTION_CONFIRM message 805 to the MIH middleware 250.

At 809, the WCDMA modem 230 sends WCDMA measurement reports in a WCDMA measurement report message 806 to the MIH middleware 250. At 807, the WiBro modem 220 reports periodically the requested WiBro scan result after internal thresholds are crossed. This WiBro modem reporting may be in the form of a WiBro measurement report 808 sent to the MIH middleware 250.

At the conclusion of the procedure depicted in FIG. 8, State Two 690 is achieved.

Figure 9:
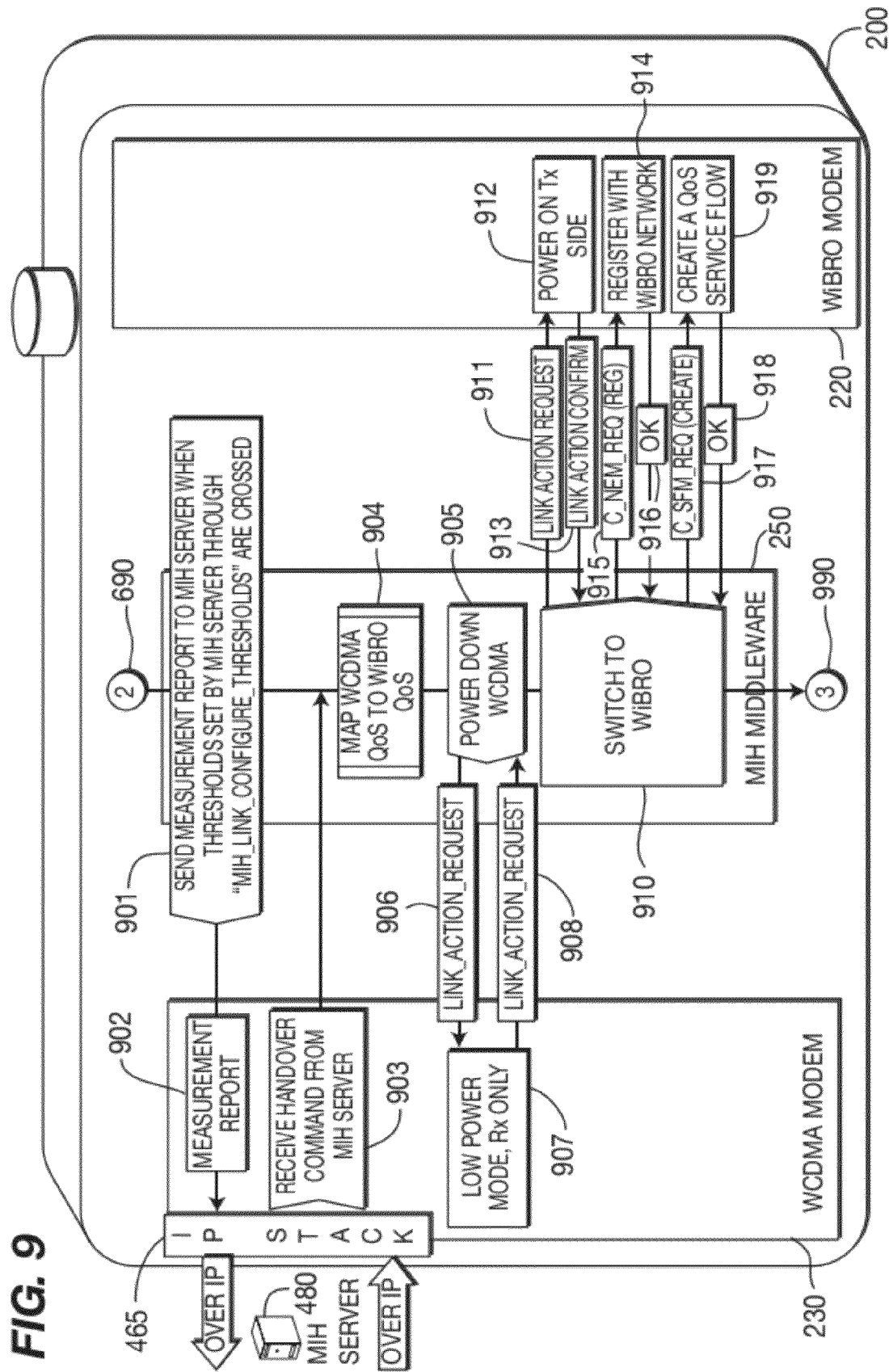
FIG. 9 is a functional block diagram of an exemplary handover trigger and execution start procedure for WCDMA to WiBro handover.

FIG. 9 is a functional block diagram of a handover trigger and execution start procedure for WCDMA to WiBro handover in accordance with an embodiment. The WTRU 200 includes the MIH middleware 250, WCMDA modem 230, and WIBRO modem 220. The WCDMA modem 230 communicates with the IP stack 465. The IP stack 465 communicates via IP with the MIH server 480. The IP stack 465 can be configured to use UDP or TCP in the transport layer. The procedure of FIG. 9 may be begun when State Two 690 has been achieved.

At 901, the MIH middleware 250 acts to send a measurement report 902 to the MIH server 480. The measurement report 902 is sent to the MIH server 480 when thresholds set by the MIH server 480 through an MIH_LINK_CONFIGURE_THRESHOLDS command have been crossed. The measurement report 902 is sent from the MIH middleware 250 to the WCDMA modem 230, and is then sent by the WCDMA modem 230 via the IP stack 465 to the MIH server 480.

At 903, the WCDMA modem 230 receives a handover command from the MIH server 480. The handover command is then communicated to the MIH middleware 250. At 904, WCDMA quality of service (QoS) is mapped to WiBro QoS. At 905, the MIH middleware 250 acts to power down the WCDMA modem 230. The MIH middleware sends a LINK_ACTION_REQUEST message 906 to the WCDMA modem 230, which at 907 enters low power mode in receive mode only. The WCDMA modem 230 may send a LINK_ACTION_CONFIRM message 908 to the MIH middleware 250.

At 910, the MIH middleware 250 performs a switch to WiBro. A LINK_ACTION_REQUEST message 911 is sent by the MIH middleware 250 to the WiBro modem 220. At 912, the WiBro modem 220 powers on at the transmitter (Tx) side. The WiBro modem 220 sends a LINK_ACTION_CONFIRM message 913 to the MIH middleware 250. The MIH middleware 250 then sends a C-NEM-REQ(REG) message 915 to the WiBro modem 220. At 914, the WiBro modem 220 registers with the WiBro network. The WiBro modem 220 responds to the C-NEM-REQ(REG) message 915 by sending a confirmation (OK) message 916 to the MIH middleware 250. The MIH middleware 250 sends a C-SFM-REQ(CREATE) message 917 to the WiBro modem 220. The WiBro modem 220 creates a new QoS service flow. The WiBro modem 220 responds to the C-SFM-REQ(CREATE) message 917 by sending a confirmation (OK) message 918 to the MIH middleware 250.

At the conclusion of the procedure depicted in FIG. 8, State Three 990 is achieved.

Figure 10:
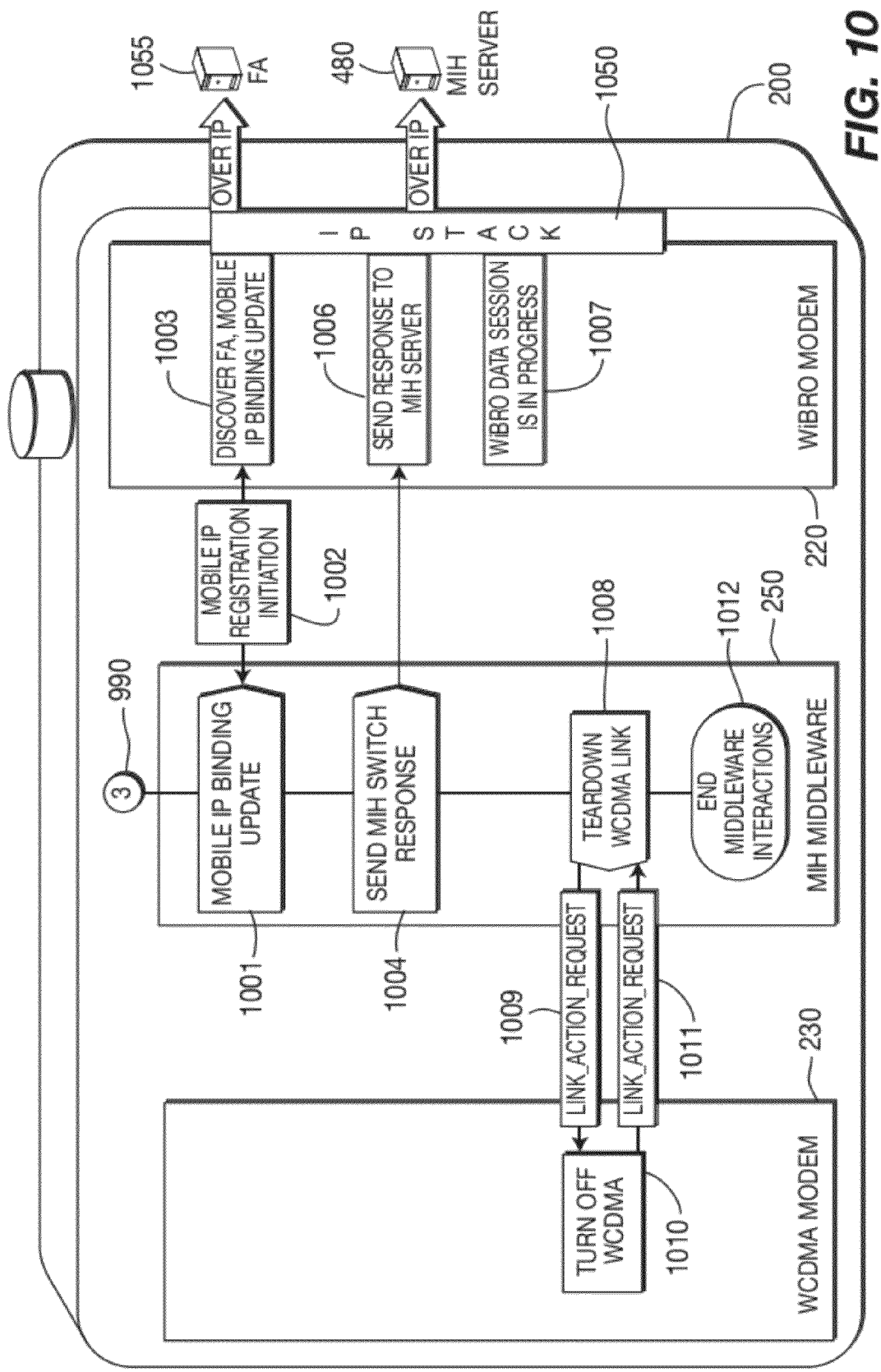
FIG. 10 is a functional block diagram of an exemplary handover trigger and execution finish procedure for WCDMA to WiBro handover.

FIG. 10 is a functional block diagram of a handover trigger and execution finish procedure for WCDMA to WiBro handover in accordance with an embodiment. The WTRU 200 includes the MIH middleware 250, WCMDA modem 230, and WIBRO modem 220. The WiBro modem 220 communicates with the IP stack 1050. The IP stack 465 communicates via IP with the MIH server 480 and the FA server 1055. The IP stack 465 can be configured to use UDP or TCP in the transport layer. The procedure of FIG. 10 may be begun when State Three 990 has been achieved.

At 1001, the MIH middleware 250 acts to update a Mobile IP binding. Mobile IP registration information 1002 is communicated between the MIH middleware 250 and the WiBro modem 220. At 1003, discovery in conjunction with the FA server 1055 is performed, and a Mobile IP binding update is performed. The actions of 1003 are performed via the IP stack 1050. At 1004, the MIH middleware 250 acts to send an MIH Switch Response. At 1006, the WiBro modem 220 sends an MIH switch response to the MIH server 480 via the IP stack 1050. At 1080, a WiBro data session is in progress. At 1008, the MIH middleware 250 acts to tear down the WCDMA link. The MIH middleware 250 sends a LINK_ACTION_REQUEST message 1009 to the WCDMA modem 230. At 1010, the WCDMA modem 230 turns off WCDMA, and sends a LINK_ACTION_CONFIRM message 1011.

At 1012, middleware interactions are ended and the procedure of FIG. 10 concludes.

Figure 11:
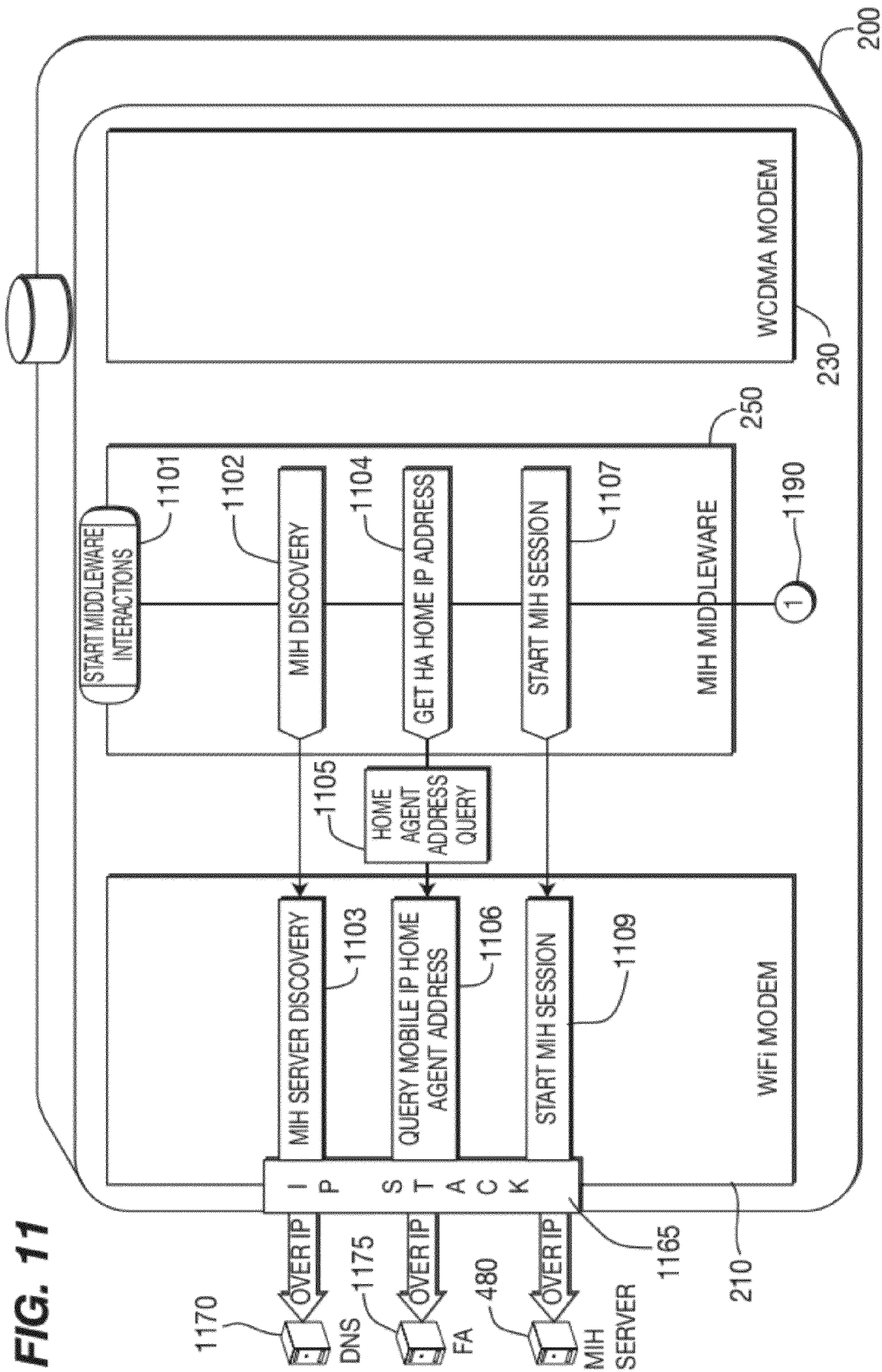
FIG. 11 is a functional block diagram of an exemplary registration procedure for WiFi to WCDMA handover.

FIG. 11 is a functional block diagram of an exemplary registration procedure for WiFi to WCDMA handover in accordance with an embodiment. The WTRU 200 includes an MIH middleware 250, WiFi modem 210, and WCDMA modem 230. The WiFi modem 210 communicates with an IP stack 1165. The IP stack 1165 communicates via IP with a DNS 1170, FA server 1175, and an MIH server 480. The IP stack 1165 can be configured to use UDP or TCP in the transport layer.

At 1101, middleware interactions are begun. At 1102, the MIH middleware 250 acts to start MIH discovery. At 1103, the WiFi modem 210 communicates an MIH server discovery command via the IP stack 1165 to the DNS 1170. At 1004, the MIH middleware 250 acts to obtain an HA address. The MIH middleware 250 sends a Home Agent Address Query message 1105 to the WiFi modem 210. At 1106, the WiFi modem 210 communicates a command to query a Mobile IP HA Address to the FA server 1175 via the IP stack 1175. At 1107, the MIH middleware 250 acts to start an MIH handover session. At 1109, the WiFi modem 210 communicates a start MIH session message to the MIH server 480 via the IP stack 1165.

At the conclusion of the procedure depicted in FIG. 11, State One 1190 is achieved.

Figure 12:
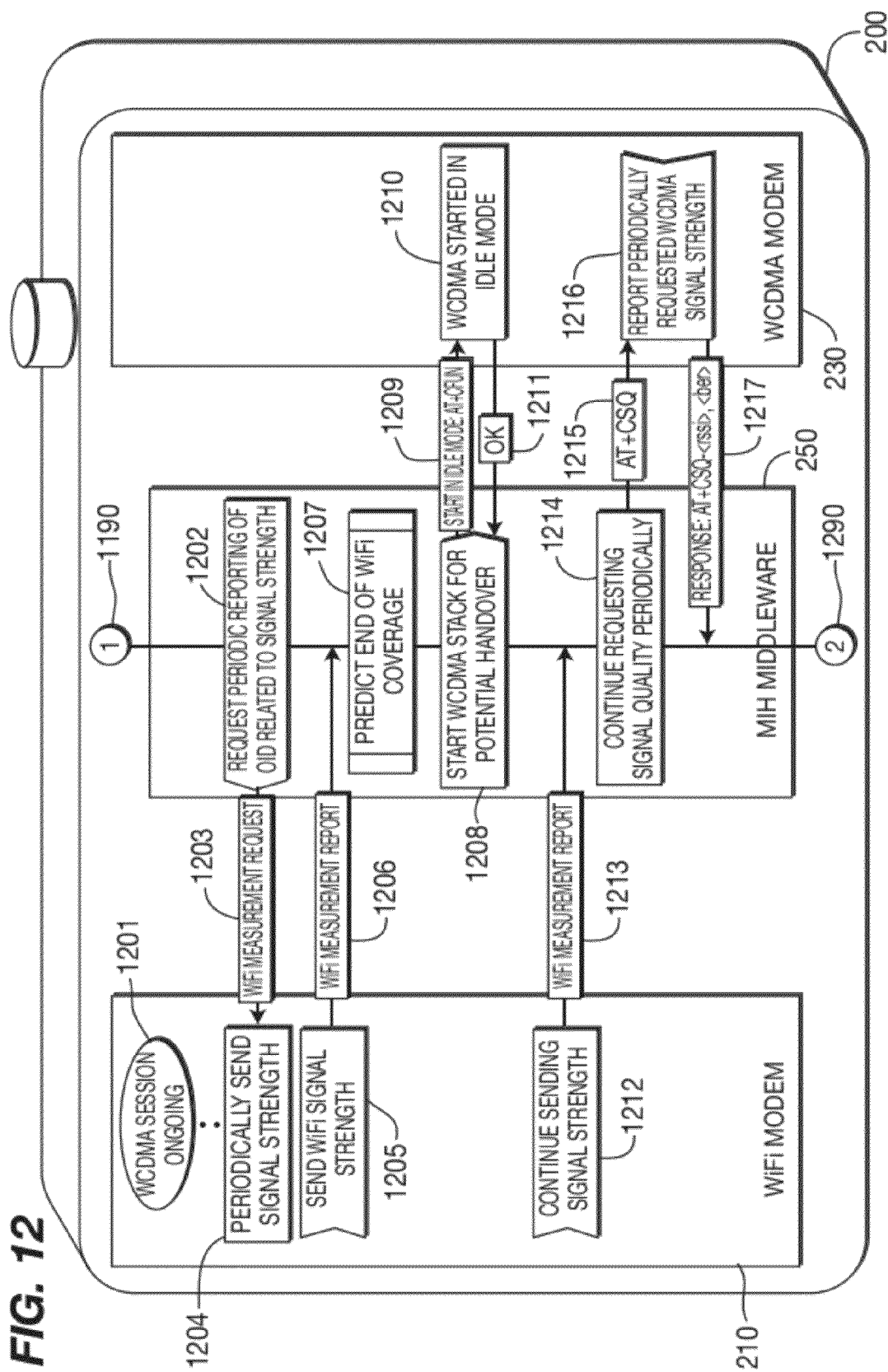
FIG. 12 is a functional block diagram of an exemplary detection procedure for WiFi to WCDMA handover.

FIG. 12 is a functional block diagram of an exemplary detection procedure for WiFi to WCDMA handover in accordance with an embodiment. The WTRU 200 includes an MIH middleware 250, WiFi modem 210, and WCDMA modem 230. The procedure of FIG. 10 may be begun when State One 1190 has been achieved.

As seen in 1201, a WiFi session is ongoing. At 1202, the MIH middleware 250 acts to request periodic reporting of ObjectIDs (OIDs) related to message strength. The MIH middleware sends 250 a WiFi Measurement Request message 1203 to the WiFi modem 210. At 1204, the WiFi modem 210 periodically sends a signal strength report. At 1205, the WiFi modem 210 communicates signal strength information via a WiFi Measurement Report message 1206 to the MIH middleware 250. At 1207, the MIH middleware 250 uses the signal strength data to predict the end of WiFi coverage. At 1208, in response to a prediction of the end of WiFi coverage, the MIH middleware 250 acts to start the WCDMA modem 230 for potential handover. The MIH middleware 250 sends a start message (AT+CFUN) 1209 to the WCDMA modem 230. At 1210, the WCDMA modem 230 starts in idle mode. After starting in idle mode, the WCDMA modem 230 sends a confirmation (OK) message 1211. At 1212, the WiFi modem 210 continues to provide signal strength information to the MIH middleware 250. This is performed by communicating a WiFi Measurement Report message 1213. At 1214, the MIH middleware 250 continues to request signal quality information periodically. This is performed by sending a signal quality request message (AT+CSQ) 1215. At 1216, the WCDMA modem 230 periodically reports requested WCDMA signal strength information. This is performed by sending a signal strength response (AT+CSQ-<<rssi>, <ber>) message 1217.

At the conclusion of the procedure depicted in FIG. 12, State Two 1290 is achieved.

Figure 13:
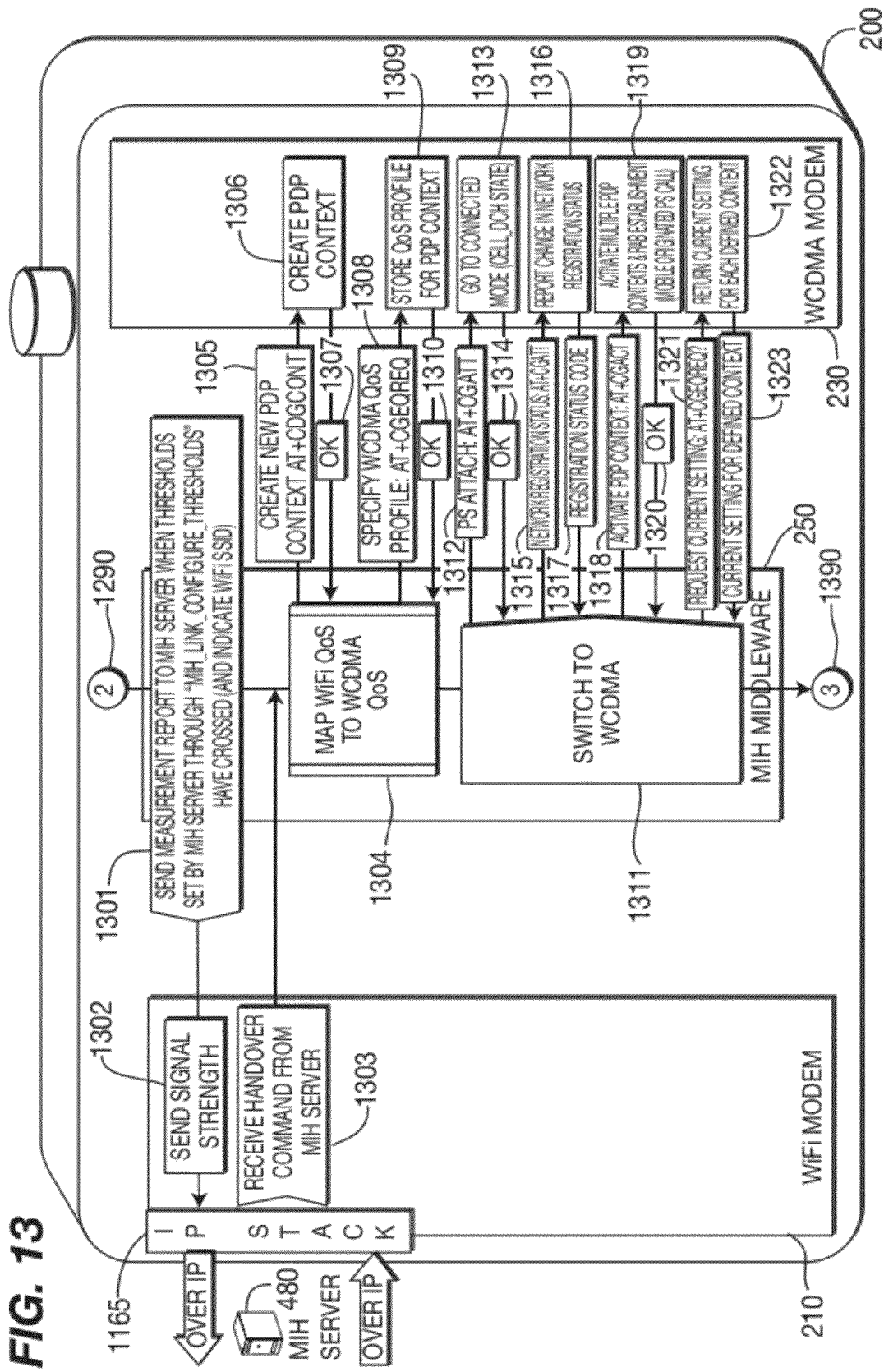
FIG. 13 is a functional block diagram of an exemplary handover and execution start procedure for WiFi to WCDMA handover.

FIG. 13 is a functional block diagram of an exemplary handover and execution start procedure for WiFi to WCDMA handover in accordance with an embodiment. The WTRU 200 includes an MIH middleware 250, WiFi modem 210, and WCDMA modem 230. The WiFi modem 210 communicates with an IP stack 1165. The IP stack 1165 communicates via IP with the MIH server 480. The IP stack 1165 can be configured to use UDP or TCP in the transport layer. The procedure of FIG. 13 may be begun when State Two 1290 has been achieved.

At 1301, the MIH middleware 250 acts to send a measurement report to the MIH server 480 when thresholds sets by the MIH server have been crossed. Thresholds may be communicated from the MIH server to the MIH middleware via a MIH_LINK_CONFIGURE_THRESHOLDS command. At 1302, the WiFi modem 210 communicates a signal strength report to the MIH server 480 via the IP stack 1165. In response to the report, the MIH server 480 may begin a handover. At 1303, the WiFi modem receives a handover command from the MIH server 1303. The WiFi modem 210 then sends the command to the MIH middleware 250.

At 1304, WiFi quality of service (QOS) is mapped by the MIH middleware 250 to WCDMA QoS. This is performed by the creation of a new PDP context in the WCDMA modem 230 and by specifying a WCDMA Qos Profile. To create a new PDP context, a Create New PDP Context message (AT+CGDCONT) 1305 is communicated to the WCDMA modem 230 by the MIH middleware 250. At 1306, the WCDMA modem 230 creates a new PDP context. The WCDA modem 230 then sends a confirmation (OK) message 1307 to the MIH middleware 250. The MIH middleware 250 sends a profile specification (AT+CGEQREQ) message 1308 to the WCDMA modem 230. At 1309, the WCDMA modem 230 stores the QoS profile for the PDP context. The WCDMA modem 230 then sends a confirmation (OK) message 1301 to the MIH middleware 250.

At 1311, the MIH middleware 250 acts to switch to WCDMA. The MIH middleware 250 sends a Packet-Switched (PS) Attach (AT+CGATT) message to the WCDMA modem 230. At 1313, the WCDMA modem 230 goes to Connected Mode (CELL_DCH state). The WCDMA modem 230 sends a confirmation (OK) message 1314 to the MIH middleware 250. The MIH middleware 250 sends a network registration status (AT+CGATT?) message 1315 to the WCDMA modem 230. At 1316, the WCDMA modem 230 reports a change in network registration status by sending a registration status code message 1317. The MIH middleware 250 sends an Activate PDP Context (AT+CGACT) message 1318 to the WDMCA modem 230. At 1319, the WCDMA modem 230 activates multiple PDP contexts and establishes a radio access bearer (RAB). The WCDMA modem 230 sends a confirmation (OK) message 1320 to the MIH middleware 250. The MIH middleware 250 then sends a Request Current Setting (AT+CGEQREQ?) message 1321 to the WCDMA modem 230. At 1322, the WCDMA modem 230 returns the current setting for each defined context. This is performed by sending a current setting message 1323 to the MIH middleware 250.

At the conclusion of the procedure depicted in FIG. 13, State Three 1390 is achieved.

Figure 14:
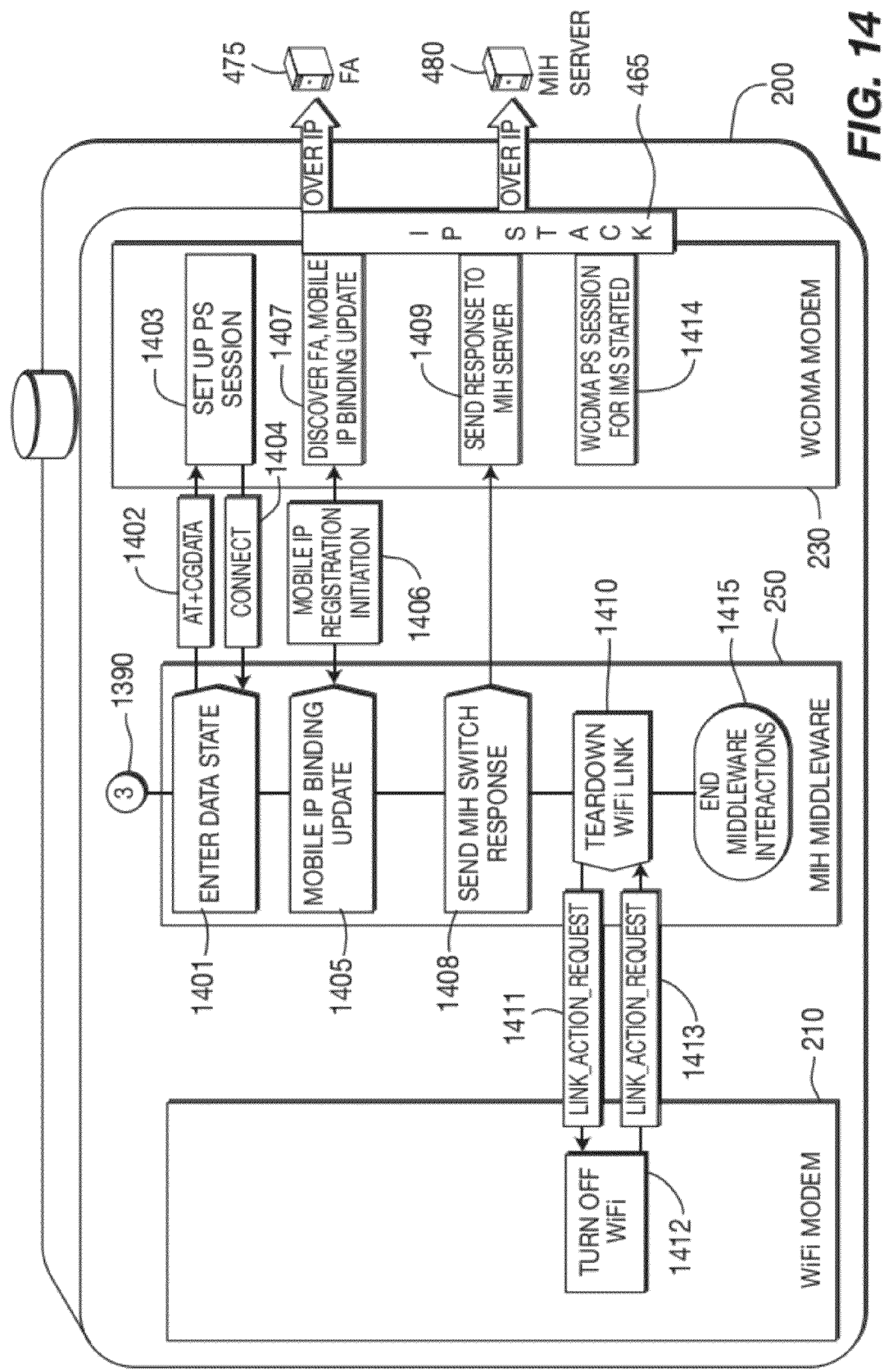
FIG. 14 shows a functional block diagram of an exemplary handover finish execution procedure for WiFi to WCDMA handover.

FIG. 14 shows a functional block diagram of an exemplary handover finish execution procedure for WiFi to WCDMA handover in accordance with an embodiment. The WTRU 200 includes an MIH middleware 250, WiFi modem 210, and WCDMA modem 230. The WCDMA modem 230 communicates with IP stack 465. The IP stack 465 communicates via IP with the MIH server 480 and FA server 475. The IP stack 465 can be configured to use UDP or TCP in the transport layer. The procedure of FIG. 14 may be begun when State Three 1390 has been achieved.

At 1401, the MIH middleware 250 enters a data state. The MIH middleware 250 sends an AT+CGDATA message 1402 to the WCDMA modem 230. At 1403, the WCDMA modem sets up a packet-switched (PS) session. A connect message 1404 is then communicated to the MIH middleware 250. At 1405, the MIH middleware acts to start a Mobile IP binding update. It sends a Mobile IP registration initiation message 1406 to the WCMDA modem 230. At 1407, discovery in conjunction with the FA server 1055 is performed, and a Mobile IP binding update is performed. The actions of 1407 are performed via the IP stack 465. At 1408, the MIH middleware 250 sends a send MIH switch response to the WCDMA modem 230. At 1409, the WCDMA modem 230 sends the MIH switch response to the MIH server 480 via the IP stack 465. At 1410, the MIH middleware 250 sends a link switch command to tear down the WiFi link. This is performed by sending a LINK_ACTION_REQUEST message 1411 to the WiFi modem 210. At 1412, the WiFi modem 210 turns off WiFi. Then the WiFi modem 210 sends a LINK_ACTION_ CONFIRM message 1413 to the MIH middleware 250. At 1415, the middleware interactions are ended and the procedure of FIG. 14 concludes.

Figure 15:
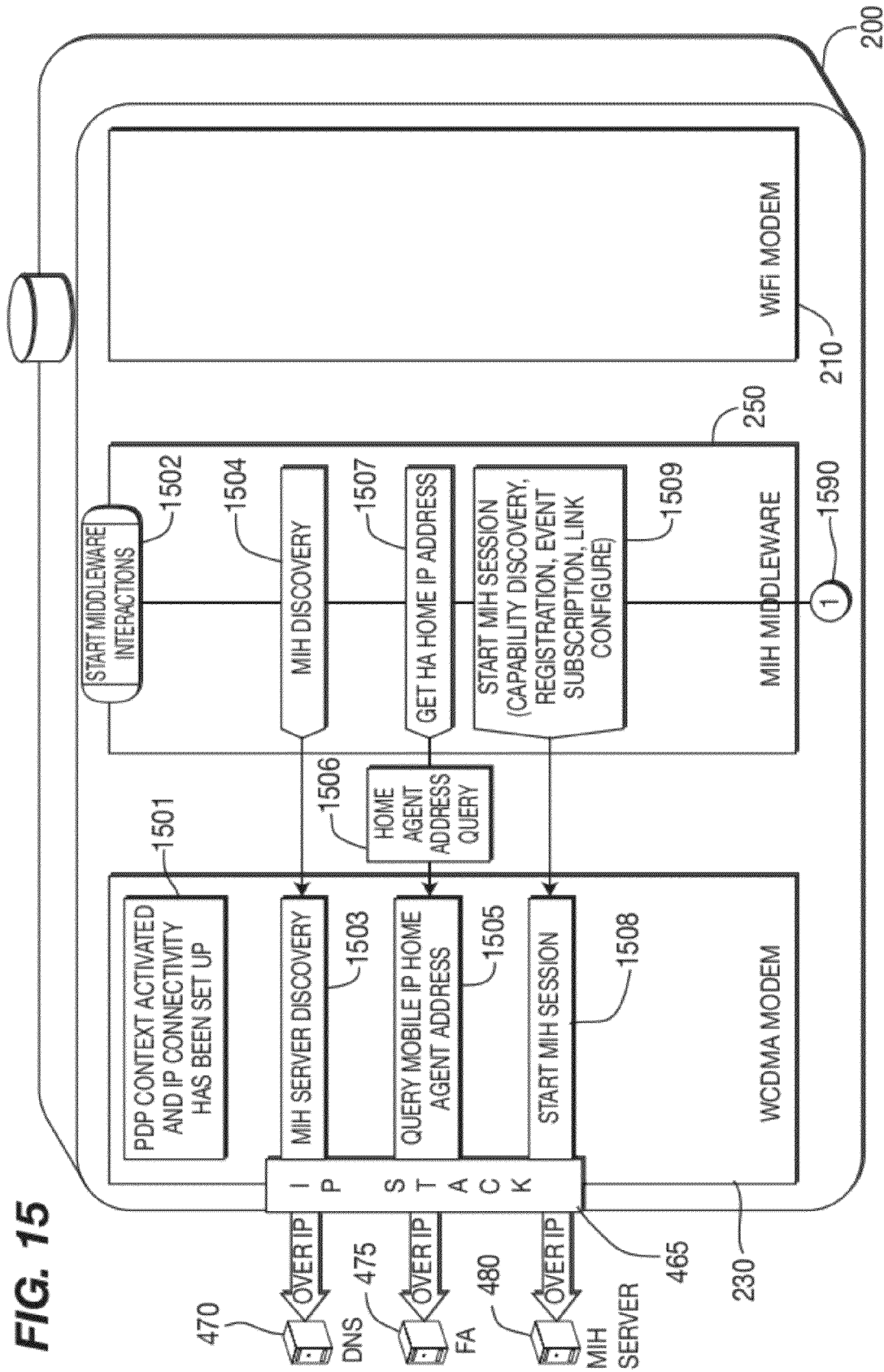
FIG. 15 is a functional block diagram of an exemplary registration procedure for WCDMA to WiFi handover.

FIG. 15 is a functional block diagram of a registration procedure for WCDMA to WiFi handover in accordance with an embodiment. The WTRU 200 includes an MIH middleware 250, WCDMA modem 230, and WiFi modem 210. The WCDMA modem 230 communicates with IP stack 465. The IP stack 465 communicates via IP with the MIH server 480, FA server 475, and DNS 470. The IP stack 465 can be configured to use UDP or TCP in the transport layer.

As seen in 1501, a PDP context is activated and IP connectivity has been set up. At 1502, MIH middleware interactions are begun. At 1504, the MIH middleware 250 acts to start MIH discovery. At 1503, the WCDMA modem 230 acts to perform MIH server discovery by sending a request to the DNS 1470 via the IP stack 465. At 1507, the MIH middleware 250 acts to obtain a Home Agent IP address. This is performed by sending a Home Agent Address Query message 1506 to the WCDMA modem 230. At 1505, the WCDMA modem 230 queries the FA server 475 via the IP stack 465 for a Mobile IP HA address for the WTRU. At 1509, the MIH middleware 1506 acts to start an MIH session. The MIH session may include capability, discovery, registration, event subscription, and link configure functions. At 1508, the WCDMA modem 230 communicates a start MIH session message to the MIH server 480 via the IP stack 465.

At the conclusion of the procedure depicted in FIG. 15, State One 1590 is achieved.

Figure 16:
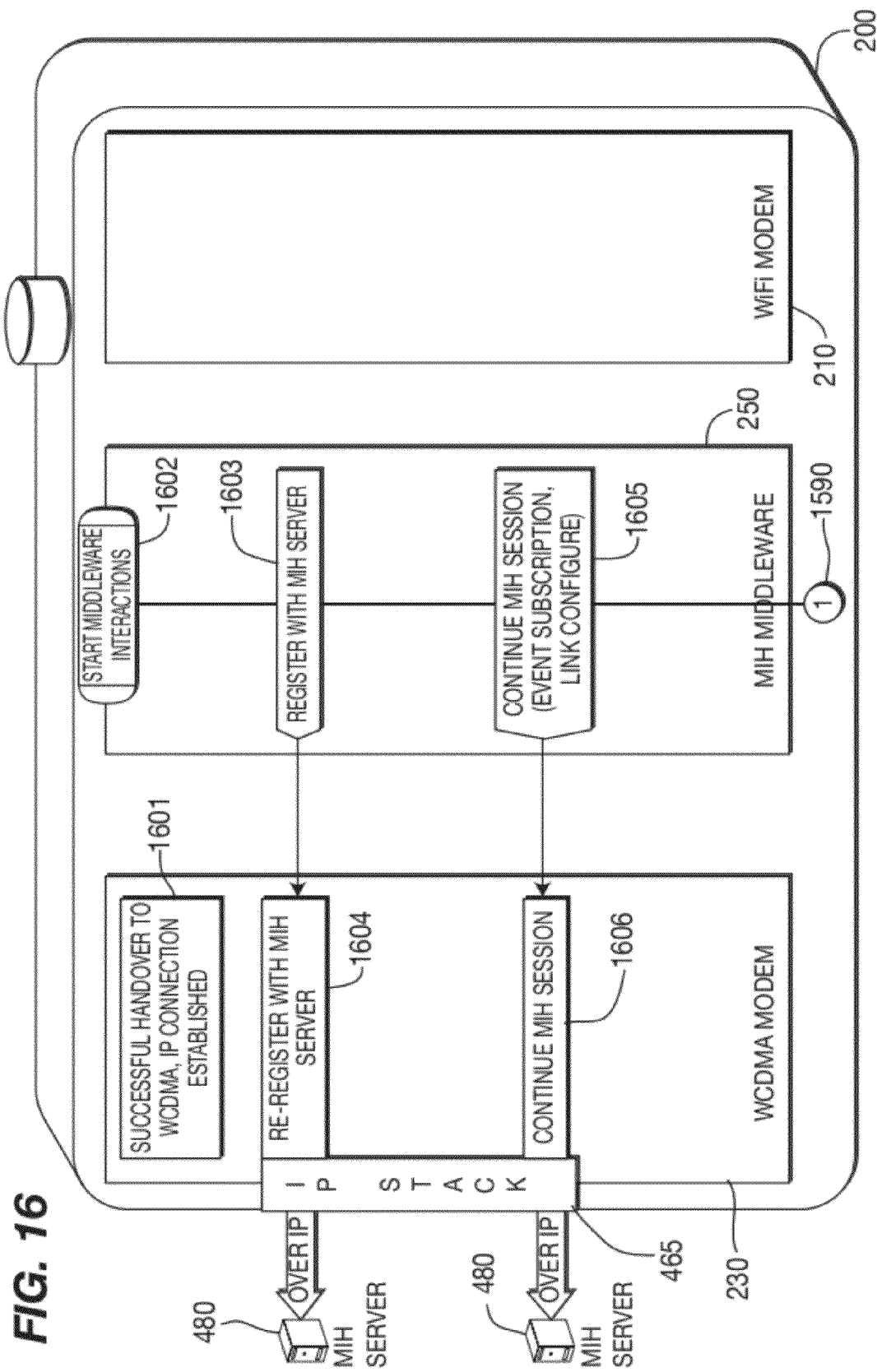
FIG. 16 is a functional block diagram of an exemplary alternative registration procedure for WCDMA to WiFi handover.

FIG. 16 is a functional block diagram of an alternative registration procedure for WCDMA to WiFi handover in accordance with an alternative embodiment. The WTRU 200 includes an MIH middleware 250, WCDMA modem 230, and WiFi modem 210. The WCDMA modem 230 communicates with IP stack 465. The IP stack 465 communicates via IP with the MIH server 480. The IP stack 465 can be configured to use UDP or TCP in the transport layer.

As seen in 1601, the WTRU has successfully completed handover to WCDMA and an IP connection has been established. The MIH middleware 250 is already operative. At 1602, middleware interactions are begun. At 1603, the MIH middleware 250 acts to register with the MIH server 480. At 1604, the WCDMA modem 230 re-registers with the MIH server 480 via the IP stack 465. At 1605, the MIH middleware 1605 continues the MIH session. The MIH session may include event subscription and link configuration functions. At 1606, the WCDMA modem 230 continues the MIH session by communicating to the MIH server 480 via the IP stack 465.

At the conclusion of the procedure depicted in FIG. 16, State One 1590 is achieved.

Figure 17:
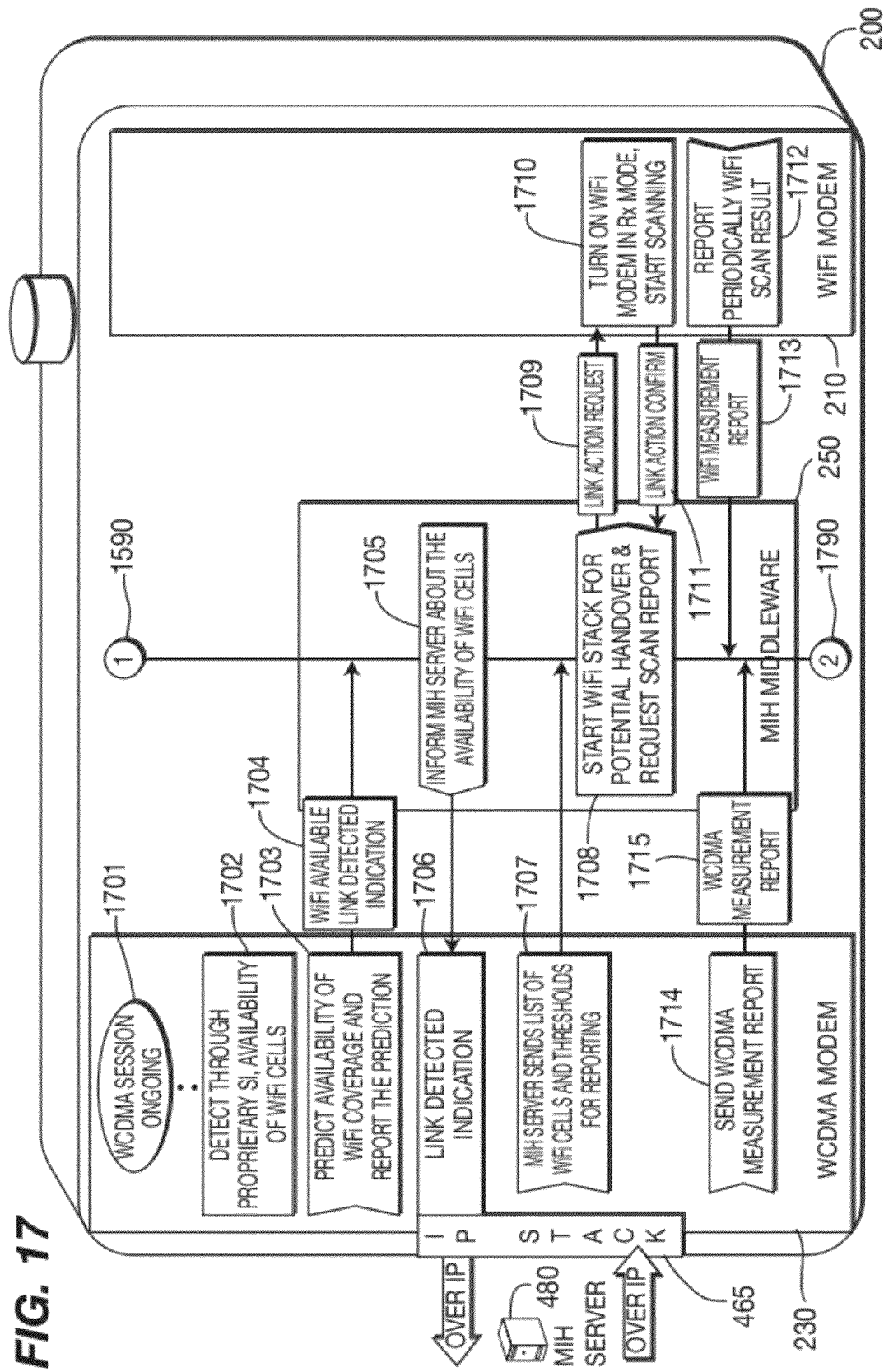
FIG. 17 is a functional block diagram of an exemplary detection procedure for WCDMA to WiFi handover.

FIG. 17 is a functional block diagram of a detection procedure for WCDMA to WiFi handover in accordance with an embodiment. The WTRU 200 includes an MIH middleware 250, WCDMA modem 230, and WiFi modem 210. The WCDMA modem 230 communicates with IP stack 465. The IP stack 465 communicates via IP with the MIH server 480. The IP stack 465 can be configured to use UDP or TCP in the transport layer. The procedure of FIG. 17 may be begun when State One 1590 has been achieved.

As seen in 1701, a WCDMA session is ongoing. At 1702, the availability of WiFi cells is detected through proprietary system information (SI). At 1703, the WCMDA modem 230 predicts the availability of WiFi coverage and reports the prediction to the MIH middleware 250. This is performed by sending a WiFi Available (LINK_DETECTED_INDICATION) message 1704 to the MIH middleware 250. At 1705, the MIH middleware 250 acts to inform the MIH server 480 about the availability of WiFi cells. At 1706, the WCDMA modem 230 informs the MIH server 480 about the availability of WiFi cells by communicating to the MIH server 480 via the IP stack 465. Performance of 1706 includes communicating a LINK_DETECTED_INDICATION message to the MIH server 480. At 1707, the MIH server 480 communicates to the WCDMA modem 230 via the IP stack 465 a list of WiFi cells and reporting thresholds. The WCDMA modem 230 then communicates this information to the MIH middleware 250. At 1708, the MIH middleware 250 acts to start the WiFi stack for potential handover and to request a scan report. This is performed by sending a LINK_ACTION_REQUEST message 1709 to the WiFi modem 210. At 1710, the WiFi modem turns on in receive mode and beings scanning. The WiFi modem 210 then sends a LINK_ACTION_CONFIRM message 1711 to the MIH middleware 250. At 1712, the WiFi modem periodically produces scan results and communicates WiFi measurement reports 1713 to the MIH middleware 250. At 1714, the WCDMA modem sends a WCDMA measurement report 1715 to the MIH middleware 250.

At the conclusion of the procedure depicted in FIG. 17, State Two 1790 is achieved.

Figure 18:
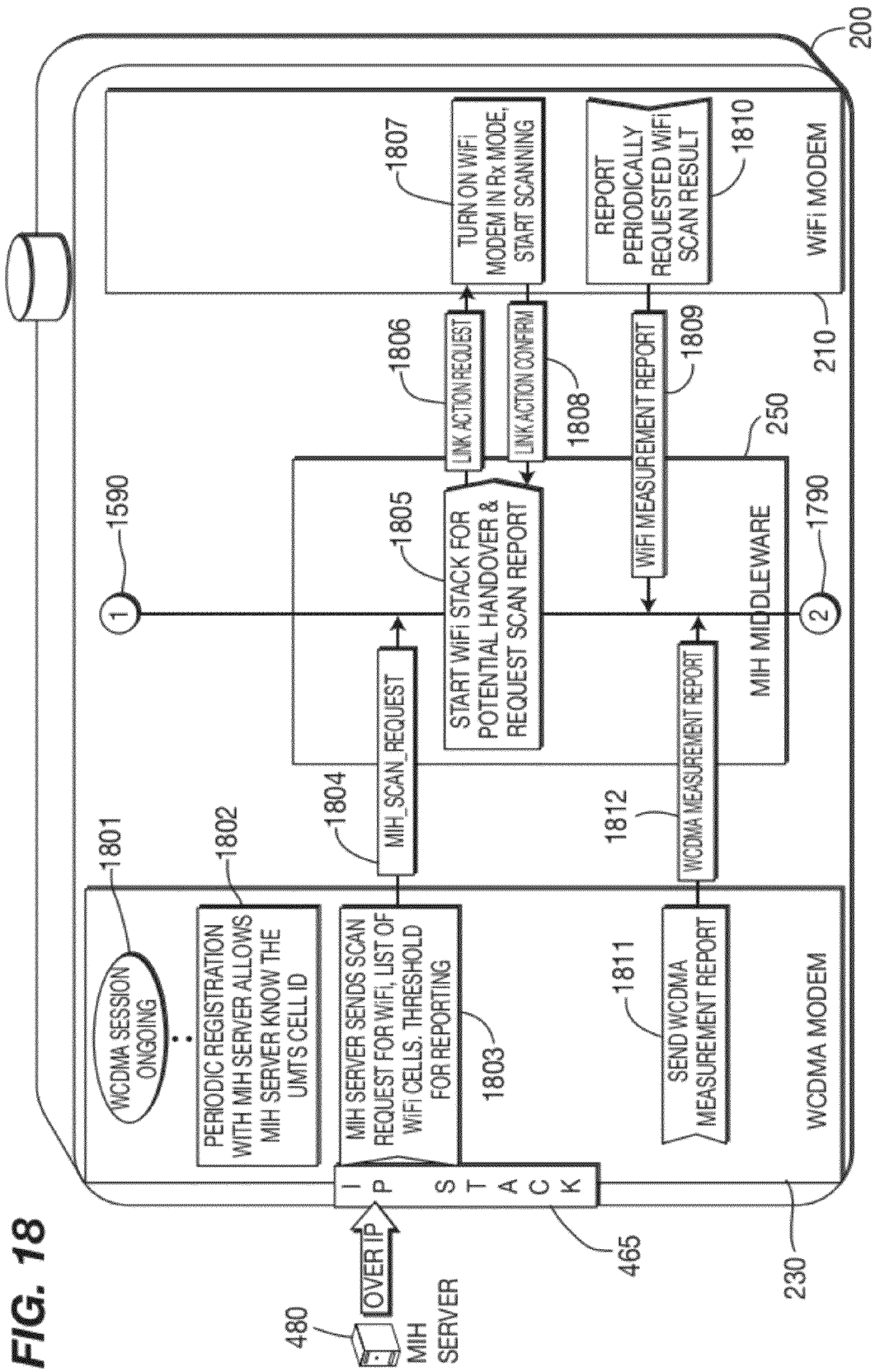
FIG. 18 is a functional block diagram of an exemplary alternative detection procedure for WCDMA to WiFi handover.

FIG. 18 is a functional block diagram of an alternative detection procedure for WCDMA to WiFi handover in accordance with an alternative embodiment. The WTRU 200 includes an MIH middleware 250, WCDMA modem 230, and WiFi modem 210. The WCDMA modem 230 communicates with IP stack 465. The IP stack 465 communicates via IP with the MIH server 480. The IP stack 465 can be configured to use UDP or TCP in the transport layer. The procedure of FIG. 18 may be begun when State One 1590 has been achieved.

As seen in 1801, a WCMDA session is ongoing. As seen in 1802, periodic registration with the MIH server is performed, allowing the MIH server to be aware of the UMTS cell ID. At 1803, the MIH server 480 communicates a scan request to the WCDMA modem 230, the request including a list of WiFi cells and a threshold for reporting. The WCDMA modem 230 sends a MIH_SCAN_REQUEST message to the MIH middleware 250. At 1805, the MIH middleware 250 acts to start the WiFI stack for potential handover and to request a scan report. Performance of 1805 includes communicating a LINK_ACTION_REQUEST message 1806 to the WiFi modem 210. At 1807, the WiFi modem 210 turns on in receive mode and begins scanning. The WiFi modem 210 communicates a LINK_ACTION_CONFIRM message 1808 to the MIH middleware 250. At 1810, the WiFi modem 210 periodically produces requested scan results and communicates WiFi measurement reports 1809 to the MIH middleware 250. At 1811, the WCDMA modem 230 sends a WCDMA measurement report 1812 to the MIH middleware 250.

At the conclusion of the procedure depicted in FIG. 18, State Two 1790 is achieved.

Figure 19:
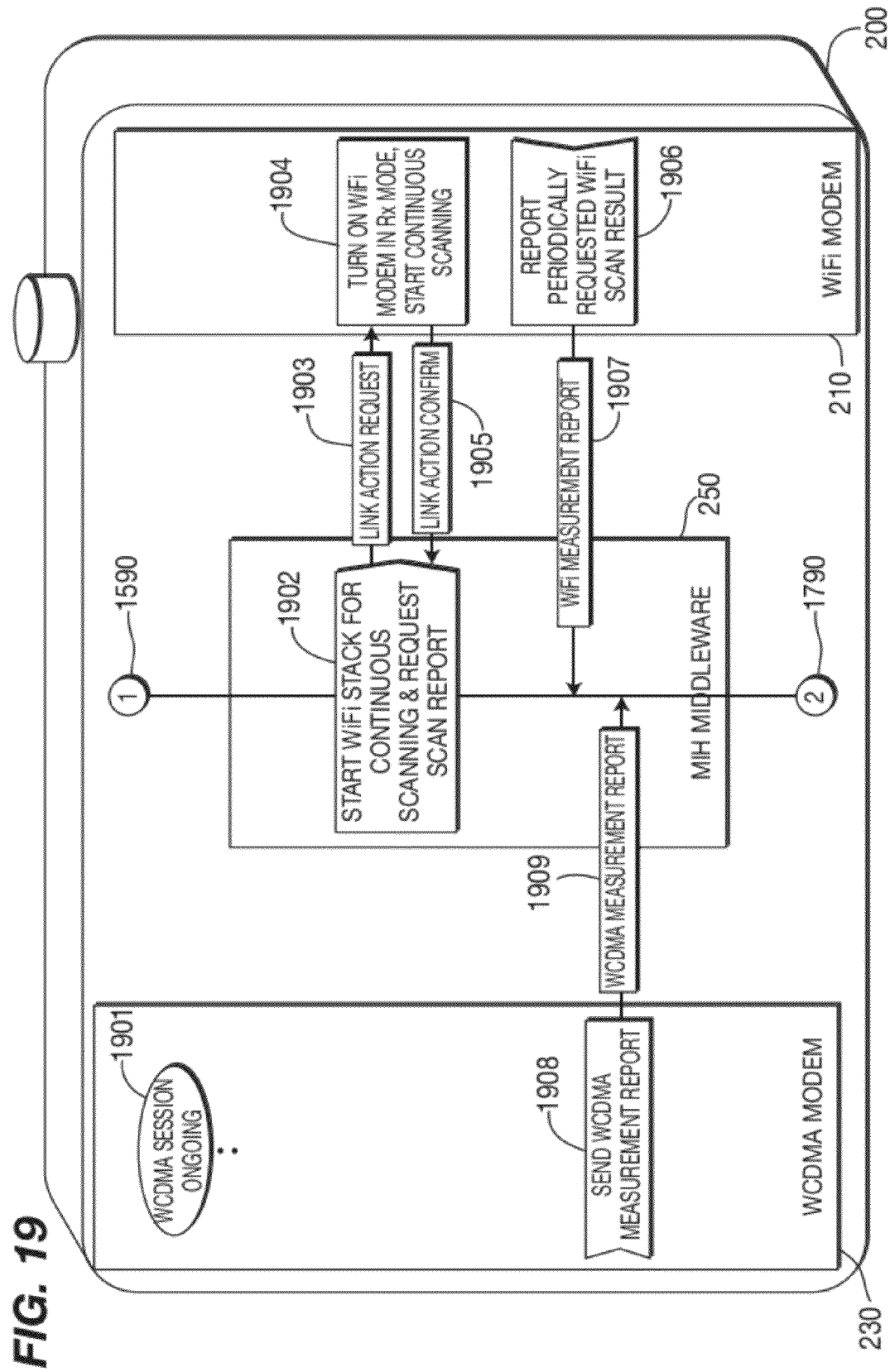
FIG. 19 is a functional block diagram of an exemplary alternative detection procedure for WCDMA to WiFi handover.

FIG. 19 is a functional block diagram of an alternative detection procedure for WCDMA to WiFi handover in accordance with an alternative embodiment. The WTRU 200 includes an MIH middleware 250, WCDMA modem 230, and WiFi modem 210. The procedure of FIG. 19 may be begun when State One 1590 has been achieved.

As seen in 1901, a WCDMA session is ongoing. At 1902, the MIH middleware acts to start the WiFi stack for continuous scanning and to request a scan report. Performance of 1902 includes sending a LINK_ACTION_REQUEST message 1903 to the WiFi modem 210. At 1904, the WiFi modem 210 turns on receive mode and begins continuous scanning. The WiFi modem 210 sends a LINK_ACTION_CONFIRM message 1905 to the MIH middleware 250. At 1906, the WiFi modem 210 periodically produces requested scan results and communicates WiFi measurement reports 1907 to the MIH middleware 250. At 1908, the WCDMA modem sends a WCDMA measurement report 1909 to the MIH middleware 250.

At the conclusion of the procedure depicted in FIG. 19, State Two 1790 is achieved.

Figure 20:
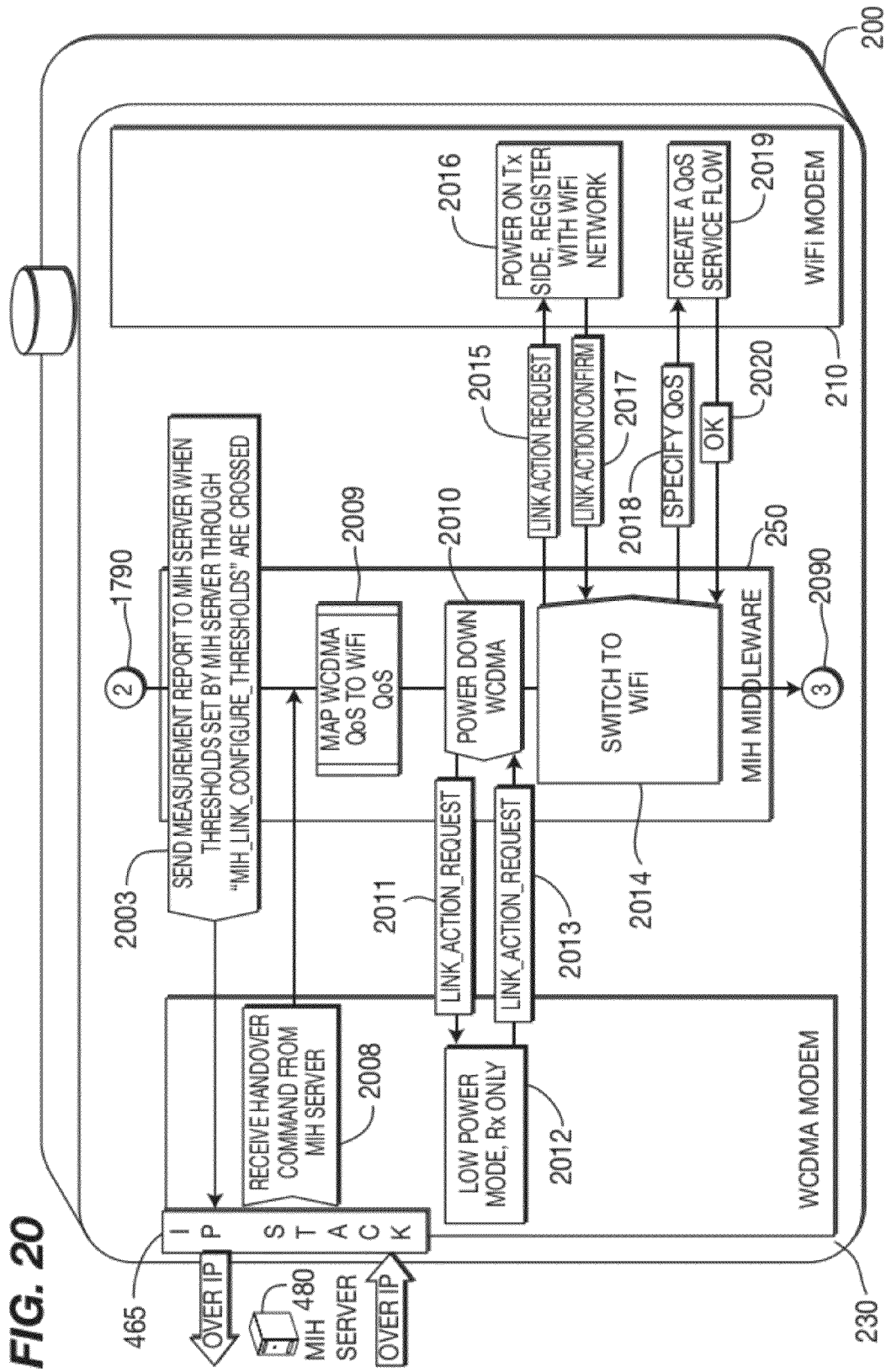
FIG. 20 is a functional block diagram of an exemplary handover trigger and execution start procedure for WCDMA to WiFi handover.

FIG. 20 is a functional block diagram of a handover trigger and execution start procedure for WCDMA to WiFi handover in accordance with an embodiment. The WTRU 200 includes an MIH middleware 250, WCDMA modem 230, and WiFi modem 210. The WCDMA modem 230 communicates with IP stack 465. The IP stack 465 communicates via IP with the MIH server 480. The IP stack 465 can be configured to use UDP or TCP in the transport layer. The procedure of FIG. 20 may be begun when State Two 1790 has been achieved.

The MIH server 480 sends MIH_LINK_CONFIGURE_THRESHOLDS commands to the WTRU. At 2003, when the thresholds set by the command are crossed, the MIH middleware 250 acts to communicate a measurement report to the MIH server 480. The report is communicated to the MIH sever 480 through the WCDMA modem 230 via the IP stack 465. At 2008, the WCDMA modem 230 receives a handover command from the MIH server 480 via the IP stack 465. The WCDMA modem 230 then communicates the handover command to the MIH middleware 250.

At 2009, the MIH middleware 250 maps WCMDA QoS to WiFi QoS. At 2010, the MIH middleware 250 acts to power down the WCDMA modem 230. Performance of 2010 includes sending a LINK_ACTION_REQUEST message 2011 to the WCDMA modem 230. At 2012, the WCDMA modem 230 enters into low power/receive only mode. The WCDMA modem 230 then sends a LINK_ACTION_CONFIRM message 2013 to the MIH middleware 250.

At 2014, the MIH middleware 250 acts to switch to WiFi. The MIH middleware sends a LINK_ACTION_REQUEST message 2015 to the WiFi modem 210. At 2016, the WiFi modem 210 powers on its transmit side and registers with a WiFi network. The WiFi modem 210 then sends a LINK_ACTION_CONFIRM message 2017 to the MIH middleware 250. The MIH middleware 250 then sends a QoS message 2018 that specifies a QoS to the WiFi modem 210. At 2019, the WiFi modem 210 creates a QoS flow. The WiFi modem then transmits a confirmation (OK) message 2020 to the MIH middleware 250.

At the conclusion of the procedure depicted in FIG. 20, State Three 2090 is achieved.

Figure 21:
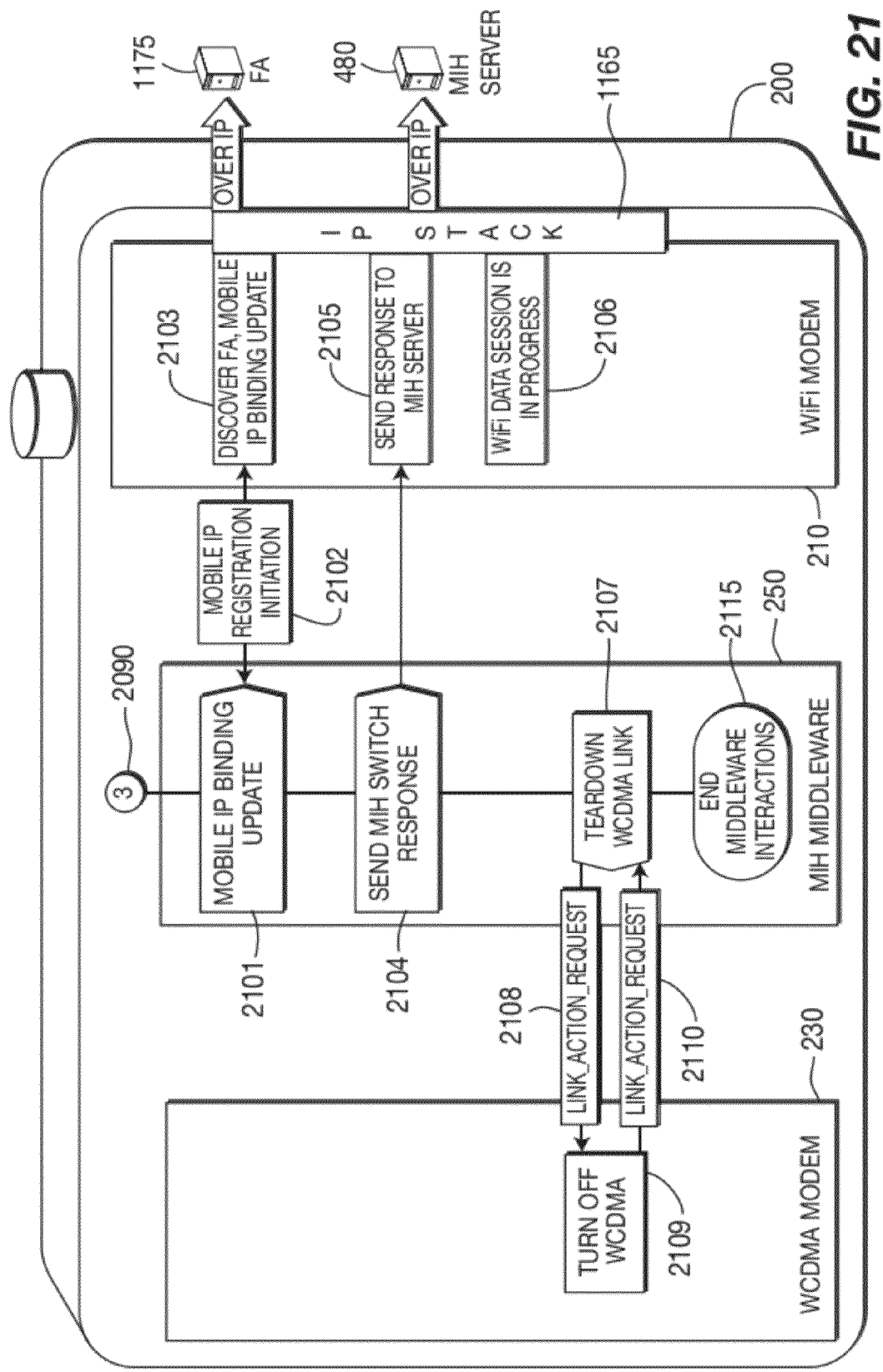
FIG. 21 is a functional block diagram of an exemplary finish handover execution procedure for WCDMA to WiFi handover.

FIG. 21 is a functional block diagram of a finish handover execution procedure for WCDMA to WiFi handover in accordance with an embodiment. The WTRU 200 includes an MIH middleware 250, WCDMA modem 230, and WiFi modem 210. The WiFi modem 210 communicates with an IP stack 1165. The IP stack 1165 communicates via IP with FA server 1175 and MIH server 480. The IP stack 1165 can be configured to use UDP or TCP in the transport layer. The procedure of FIG. 21 may be begun when State Three 2090 has been achieved.

At 2101, the MIH middleware 250 acts to start a Mobile IP binding update. Mobile IP registration information 2102 is communicated between the MIH middleware 250 and the WiFi modem 210. At 2103, the WiFi modem 210 performs discovery in conjunction with the FA server 1175, and a Mobile IP binding update is performed. The actions of 2103 are performed via the IP stack 1165.

At 2104, the MIH middleware 250 sends a send MIH switch response to the WiFi modem 210. At 2105, the WiFi modem 210 sends the MIH switch response to the MIH server 480 via the IP stack 1165. As seen in 2106, a WiFi data session is in progress.

At 2107, the MIH middleware 250 acts to tear down the WCDMA link. This is performed by sending a LINK_ACTION_REQUEST message 2108 to the WCDMA modem

230. At 2109, the WCMDA modem 230 turns off WCDMA. The WCDMA modem 230 then sends a LINK_ACTION_CONFIRM message 2110 to the MIH middleware 250. At 2115, the middleware interactions are ended and the procedure of FIG. 21 concludes.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A dual-mode wireless transmit/receive unit (WTRU) comprising:
    a first modem of a first technology type, wherein the first technology type is wideband code division multiple access (WCDMA) and the first modem is a WCDMA modem;
    a second modem of a second technology type; and
    a processor configured to operate Media Independent Handover (MIH) middleware, wherein:
    the WCDMA modem is configured to communicate with an MIH server using a WCDMA connection, and the MIH middleware is configured to receive a handover command from the MIH server via the WCMDA modem and, in response to the handover command, to map WCDMA Quality of Service (QoS) to QoS of the second technology type;
    the MIH middleware and WCMDA modem are further configured, in response to the mapping to QoS of the second technology type, to power down the WCDMA modem;
    the MIH middleware and second modem are further configured, in response to the power down of the WCDMA modem, to perform a switch from the WCDMA modem to the second modem, to subsequently perform a Mobile Internet Protocol (Mobile IP) binding update, and to subsequently communicate an MIH switch response to the MIH server; and
    the MIH middleware and the WCDMA modem are further configured, in response to the communication of the MIH switch response, to tear down the WCDMA connection.

2. The WTRU of claim 1, wherein the second technology is Wireless Broadband (WiBro) technology and the second modem is a WiBro modem.

3. The WTRU of claim 1, wherein the second technology is IEEE 802.11x (WiFi) technology and the second modem is a WiFi modem.

4. The WTRU of claim 3, wherein the second technology type is Wireless Broadband (WiBro) and the second modem is a WiBro modem.

5. The WTRU of claim 3, wherein the second technology type is IEEE 802.11x (WiFi) and the second modem is a WiFi modem.

6. The WTRU of claim 1, wherein:
    the MIH middleware and WCDMA modem are further configured, in response to the beginning of an initialization, to perform MIH server discovery, to subsequently obtain a Home Agent Internet Protocol address, and to subsequently start an MIH session.

7. The WTRU of claim 1, wherein: the MIH middleware and
    WCDMA modem are further configured, in response to a successful handover to a WCDMA network, to re-register with the MIH server and to subsequently communicate an MIH session continuation message to the MIH server.

8. The WTRU of claim 7, wherein the second technology type is Wireless Broadband (WiBro) and the second modem is a WiBro modem.

9. The WTRU of claim 7, wherein the second technology is IEEE 802.11x (WiFi) technology and the second modem is a WiFi modem.

10. The WTRU of claim 1, wherein:
    the MIH middleware and second modem are further configured to start the second modem in receiver mode; and
    the MIH middleware is further configured, in response to the starting of the second modem in receiver mode, to receive WCDMA measurement reports from the WCDMA modem and to receive measurement reports of the second technology type from the second modem.

11. The WTRU of claim 10, wherein the second technology is Wireless Broadband (WiBro) technology and the second modem is a WiBro modem.

12. The WTRU of claim 10, wherein the second first technology is IEEE 802.11x (WiFi) technology and the second modem is a WiFi modem.

13. The WTRU of claim 10, wherein:
    the WCDMA modem is further configured to detect an availability of cells of the second technology type through proprietary system information (SI) during an ongoing session, and to communicate a coverage prediction to the MIH middleware;
    the MIH middleware and WCDMA modem are further configured, in response to the coverage prediction, to communicate a cell availability message to the MIH server;

the MIH middleware is further configured, in response to the communication of the cell availability message, to receive a scan request message from the MIH server via the WCDMA modem, wherein the scan request message includes a list of cells of the second technology type and a reporting threshold; and the MIH middleware and second modem are further configured to start the second modem in receiver mode in response to the scan request message.

14. The WTRU of claim 13, wherein the second technology is Wireless Broadband (WiBro) technology and the second modem is a WiBro modem.

15. The WTRU of claim 13, wherein the second technology is IEEE 802.11x (WiF) (WiFi) technology and the second modem is a WiFi modem.

16. The WTRU of claim 10, wherein:

the WCDMA modem is further configured, in response to an ongoing session, to periodically register with the MIH server;

the MIH middleware is further configured to receive, during the periodic registration with the MIH server, a scan request message from the MIH server via the WCDMA modem, wherein the scan request message includes a list of cells of the second technology type and a reporting threshold; and the MIH middleware and second modem are further configured to start the second modem in receiver mode in response to the scan request message.

17. The WTRU of claim 16, wherein the second technology is Wireless Broadband (WiBro) technology and the second modem is a WiBro modem.

18. The WTRU of claim 16, wherein the second technology is IEEE 802.11x (WiFi) technology and the second modem is a WiFi modem.

19. A dual-mode wireless transmit/receive unit (WTRU) comprising:

a wideband code division multiple access (WCDMA) modem;

an IEEE 802.11x (WiFi) modem; and a processor configured to operate Media Independent Handover (MIH) middleware, wherein:

the WiFi modem is configured to communicate with an MIH server using a WiFi connection, and the MIH middleware is configured to receive a handover command from the MIH server via the WiFi modem and to map WiFi Quality of Service (QoS) to WCMDA QoS;

the MIH middleware and WCDMA modem are further configured, in response to the mapping to WCDMA QoS, to perform a switch from the WiFi modem to the WCDMA modem, subsequently to set up a packet-switched (PS) session, subsequently to perform a Mobile Internet Protocol (Mobile IP) binding update, and subsequently to communicate an MIH switch response to the MIH server; and the MIH middleware and the WiFi modem are further configured, in response to the communication of the MIH switch response, to close the WiFi connection.

20. The WTRU of claim 19, wherein:

the MIH middleware and WiFi modem are further configured, in response to the beginning of an initialization, to perform MIH server discovery, to subsequently obtain a Home Agent Internet Protocol address, and to subsequently start an MIH session.

21. The WTRU of claim 19, wherein:

the MIH middleware is further configured to receive a WiFi measurement report from the WiFi modem and to predict an end of WiFi coverage;

the MIH middleware and WCDMA modem are further configured, in response to the prediction of the end of WiFi coverage, to start the WCMDA modem in idle mode; and the MIH middleware is further configured, in response to the starting of the WCDMA modem in receiver mode, to receive additional WiFi measurement reports from the WiFi modem and to receive WCDMA measurement reports from the WCDMA modem.

* * * * *

UNITED STATES PATENT AND TRADEMARK OFFICE
CERTIFICATE OF CORRECTION

PATENT NO. : 8,149,790 B2
APPLICATION NO. : 12/209329
DATED : April 3, 2012
INVENTOR(S) : Purkayastha et al.

It is certified that error appears in the above-identified patent and that said Letters Patent is hereby corrected as shown below:

ON THE TITLE PAGE

At Section (56) FOREIGN PATENT DOCUMENTS, page 1, right column, before "1 670 273 6/2006", delete "JP" and insert --EP--.

At Claim 12, column 14, line 55, after "wherein the second", delete "first".

At Claim 15, column 15, line 14, after "IEEE 802.11x", delete "(WiF)".

Signed and Sealed this
Second Day of April, 2013

Teresa Stanek Rea
*Acting Director of the United States Patent and Trademark Office*